US011498431B1

(12) United States Patent
Verbridge et al.

(10) Patent No.: US 11,498,431 B1
(45) Date of Patent: Nov. 15, 2022

(54) SELECTABLE DIFFERENTIAL DRIVE FOR A VEHICLE

(71) Applicant: Rivian IP Holdings, LLC, Plymouth, MI (US)

(72) Inventors: Mason Verbridge, Canton, MI (US); Cameron P. Williams, Dexter, MI (US); Khwaja Rahman, Troy, MI (US); Henry Huang, Ann Arbor, MI (US); Vinaey Kalyanaraman, Rancho Palos Verdes, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 0 days.

(21) Appl. No.: 17/385,212

(22) Filed: Jul. 26, 2021

(51) Int. Cl.
*B60K 17/16* (2006.01)
*B60L 15/20* (2006.01)
*B60K 7/00* (2006.01)
*B60K 17/02* (2006.01)
*B60W 50/08* (2020.01)

(52) U.S. Cl.
CPC ........ *B60L 15/2054* (2013.01); *B60K 7/0007* (2013.01); *B60K 17/02* (2013.01); *B60K 17/165* (2013.01); *B60W 50/08* (2013.01); *B60L 2260/24* (2013.01); *B60L 2260/26* (2013.01)

(58) Field of Classification Search
CPC ............. B60L 15/2054; B60L 2260/24; B60L 2260/26; B60K 7/0007; B60K 17/02; B60K 17/165; B60W 50/08
See application file for complete search history.

(56) References Cited

U.S. PATENT DOCUMENTS

| 8,491,432 B2 * | 7/2013 | Radermacher ........... B60K 6/48 475/5 |
| 9,457,658 B2 * | 10/2016 | Knoblauch ......... B60L 15/2036 |
| 2014/0371016 A1 | 12/2014 | Knoblauch |
| 2019/0283574 A1 | 9/2019 | Hummel |

FOREIGN PATENT DOCUMENTS

| CN | 206598718 U | * 10/2017 | |
| DE | 102009047007 A1 | * 5/2011 | ........... B60K 17/043 |
| DE | 102019214986 A1 | 4/2021 | |
| FR | 2930743 A1 | * 11/2009 | ............... B60K 1/02 |

\* cited by examiner

*Primary Examiner* — Justin Holmes
(74) *Attorney, Agent, or Firm* — Haley Guiliano LLP; James A. Leiz; Andrew C. Lee

(57) ABSTRACT

A drive system includes a first drive train and a second drive train coupled by a differential assembly. Each drive train include a motor, an output gear, and a clutch assembly that engages and disengages the output gear from respective halfshafts. The differential assembly is configured to couple the first and second halfshafts, and connect/disconnect the first output gear and the first halfshaft. The differential assembly includes, for example, side gears, a spider gearset, and an actuator for engaging and disengaging the differential casing from the first output gear. A control system is configured to actuate actuators of clutch assemblies and/or a differential assembly to achieve one or more drive modes for each drive axis. The control system determines the first drive mode, controls the clutch assemblies and differential assemblies, and controls one or more motors. The drive modes include, for example, torque vectoring, fully locked, single motor, and neutral.

20 Claims, 15 Drawing Sheets

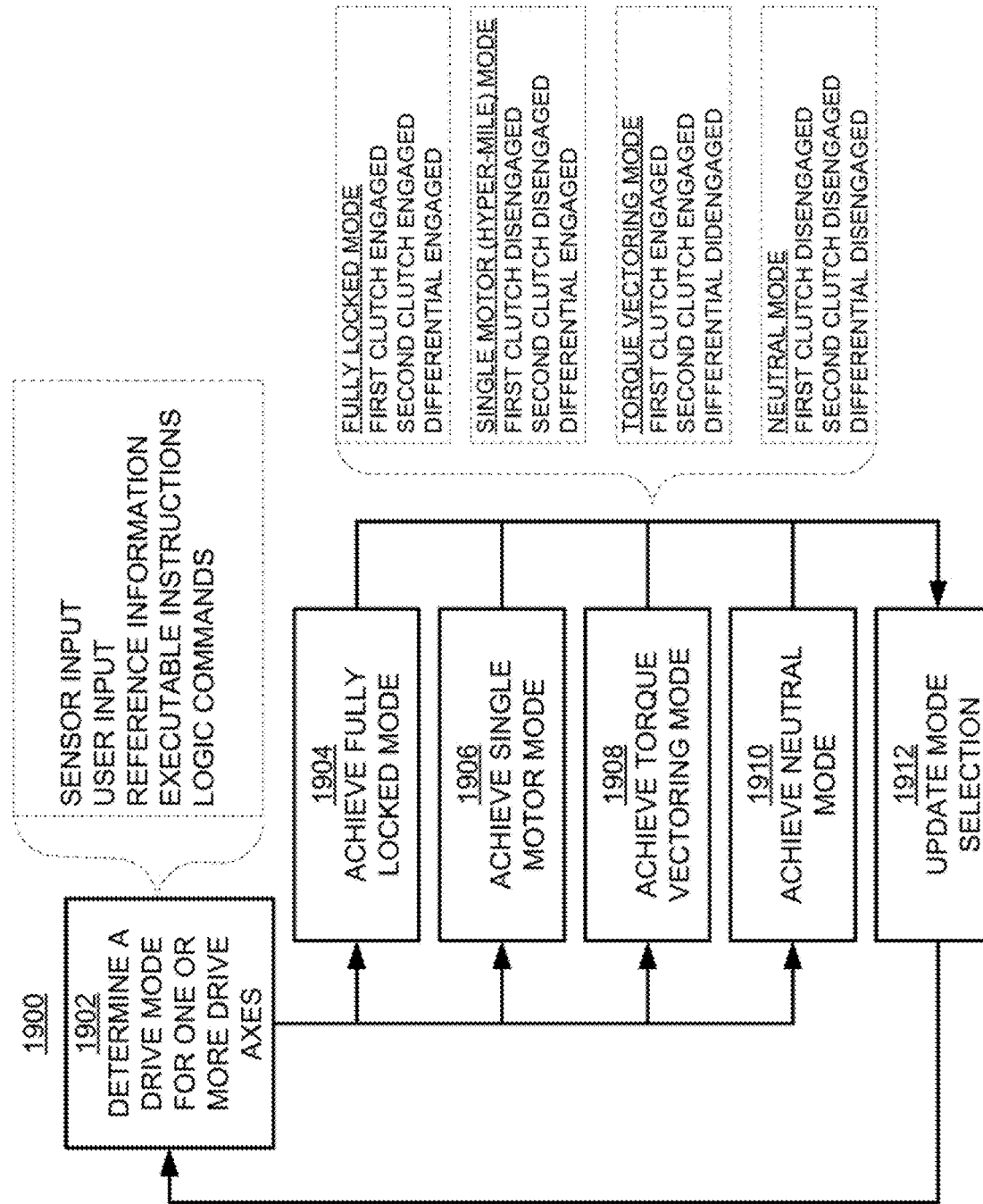

SELECTABLE DIFFERENTIAL DRIVE FOR A VEHICLE

INTRODUCTION

Vehicles that use two electric motors and two axle outputs typically align the two motors on the same rotational axis. The rotor shafts of the two motors may, for example, each enter a respective gearbox that is positioned between the two motors. This results in a stack-up of components that makes the overall assembly wide, and therefore difficult to package in certain applications. This can limit, for example, the length of the motors that can be used, which in turn limits the amount of torque and power that the motors can provide. Accordingly, it would be advantageous to provide a drive unit configuration that is shaped more conveniently for packaging. It would also be advantageous to provide a drive unit that enables a wider range of motors and accompanying components to be used.

Motors and associated gearboxes are typically designed for specific applications. For example, gearboxes are typically designed to be used in a single motor drive unit or a dual motor drive unit, but not both. As another example, a gearbox is typically designed to be used in a particular orientation and for driving a set number of wheels. Accordingly, it would be advantageous to provide drive units that can be used for more than one application, in more than one driving mode. It would also be advantageous to provide drive units which may be independent or coupled to adapt to changing driving conditions.

SUMMARY

In some embodiments, the present disclosure is directed to a drive system having a center disconnecting differential and two output gears. The first output gear is configured to rotate based on a first motor, and a first halfshaft is configured to rotate based on the first output gear. The second output gear is configured to rotate based on a second motor, and a second halfshaft is configured to rotate based on the second output gear. The center disconnecting differential couples the first halfshaft and to the second halfshaft, and is configured to connect and disconnect the first output gear from the first halfshaft. To illustrate, a neutral mode may be achieved when disconnected, and a hyper-mile (e.g., single motor) mode may be achieved when connected. In some embodiments, the system includes a first actuator configured to engage and disengage the first output gear and the differential casing.

In some embodiments, the center disconnecting differential is further configured to connect the first output gear to a casing of the center disconnecting differential. For example, in a hyper-mile mode, the first halfshaft and the second halfshaft are configured to rotate based on the first output gear while the second output gear is disconnected from the second halfshaft.

In some embodiments, the center disconnecting differential is further configured to connect the first output gear to a casing of the center disconnecting differential, and connect the second output gear to a second side gear for the second halfshaft. For example, in a transitioning mode, the first and second halfshafts are configured to rotate based on connecting the second output gear to the second side gear.

In some embodiments, the center disconnecting differential is further configured to connect the first output gear to a casing of the center disconnecting differential and a first side gear for the first halfshaft, and connect the second output gear to a second side gear for the second halfshaft. For example, in a locked mode, the first and second output gears generate an increase in torque to one or more of the first and the second halfshafts.

In some embodiments, the center disconnecting differential is further configured to disengage the first output gear from a casing of the center disconnecting differential, connect the first output gear to the first halfshaft, and connect the second output gear to a second side gear for the second halfshaft. For example, in a torque vectoring mode, the first and second output gears generate independent torques to the respective first and second halfshafts.

In some embodiments, the system includes a first clutch assembly configured to connect the first output gear to the first halfshaft by transferring torque from the first output gear to the first halfshaft, and a second clutch assembly configured to connect the second output gear to the second halfshaft by transferring torque from the second output gear to the second halfshaft.

In some embodiments, the system includes a stationary housing, a first bearing arranged between the first output gear and the stationary housing, a second bearing arranged between the second output gear and the stationary housing, and a third bearing arranged between the first output gear and the second output gear.

In some embodiments, the present disclosure is directed to a drive system of a vehicle including two output gears, two clutch assemblies, and a center disconnecting differential. The first output gear driven by a first motor, and the second output gear driven by a second motor. The first clutch assembly is configured to couple and decouple the first output gear from a first halfshaft coupled to a first wheel. The second clutch assembly is configured to couple and decouple the second output gear from a second halfshaft coupled to a second wheel. The center disconnecting differential is configured to couple the first output gear to the first output shaft and to the second halfshaft. In some embodiments, the first motor and the second motor are configured to be independently controlled.

In some embodiments, the drive system includes control circuitry. In some such embodiments, the first clutch assembly includes a first actuator coupled to the control circuitry, the second clutch assembly includes a second actuator coupled to the control circuitry, and the drive system includes a third actuator coupled to the control circuitry and configured to engage and disengage the first output gear and a differential casing. To illustrate, the control circuitry is configured to actuate and de-actuate each of the first actuator, the second actuator, and the third actuator. In some embodiments, the control circuitry is configured to achieve a first drive mode wherein the first clutch assembly is engaged, the second clutch assembly is engaged, and the center disconnecting differential is disengaged. In some embodiments, the control circuitry is configured to achieve a second drive mode wherein the first clutch assembly is engaged, the second clutch assembly is engaged, and the center disconnecting differential is engaged. In some embodiments, the control circuitry is configured to achieve a third drive mode wherein the first clutch assembly is disengaged, the second clutch assembly is disengaged, and the center disconnecting differential is engaged.

In some embodiments, the center disconnecting differential includes a spider gearset coupled to a differential casing, a first side gear coupled to the first halfshaft and engaged with the spider gearset, and a second side gear coupled to the second halfshaft and engaged with the spider gearset. In some such embodiments, the center disconnecting differential includes a first thrust washer arranged between the first side gear and the first output gear, and a second thrust washer arranged between the second side gear and a stationary section of a housing.

In some embodiments, the drive system includes a first power transfer mechanism is configured to couple rotation of the first motor shaft to rotation of the first output shaft, and reduce a rotation rate of the first output shaft relative to a rotation rate of the first motor shaft. In some embodiments, a second power transfer mechanism is configured to couple rotation of the second motor shaft to rotation of the second output shaft, and reduce a rotation rate of the second output shaft relative to a rotation rate of the second motor shaft. The power transfer mechanisms may include intermediate gears that provide reduction between the respective motor gears and output gears. In an illustrative example, the power transfer mechanism may include the motor gears, the output gears, and any optional intermediate gears, and may be configured to reduce a rotation rate between the motor shaft and the output shaft.

In some embodiments, the present disclosure is directed to a method for managing drive modes of a drive axis. The method includes controlling a first clutch coupling a first output gear and a first halfshaft of the drive axis, controlling a second clutch coupling a second output gear and a second halfshaft of drive axis, controlling a differential configured to couple the first output gear to the first halfshaft and to the second halfshaft, and controlling at least one of a first motor coupled to the first output gear or a second motor coupled to the second output gear. For example, in some embodiments, the first and second halfshafts are coupled via side gears, spider gears, and a differential casing to each other, and a differential actuator is controlled to connect or disconnect the casing with the first output gear.

In some embodiments, the method includes determining to achieve a torque vectoring mode at the drive axis. The torque vectoring mode is achieved by causing to be engaged a first clutch coupling a first output gear and a first halfshaft of the drive axis, causing to be engaged a second clutch coupling a second output gear and a second halfshaft of drive axis, causing to be disengaged a differential configured for coupling and decoupling the first halfshaft and the second halfshaft, and independently controlling rotation of the first motor and rotation of the second motor.

In some embodiments, the method includes determining to achieve a fully locked drive mode at the drive axis. The fully locked drive mode is achieved by causing to be engaged the first clutch, causing to be engaged the second clutch, and causing to be engaged the differential.

In some embodiments, the method includes determining to achieve a single motor drive mode. The single motor drive mode is achieved by causing to be disengaged the first clutch, causing to be disengaged the second clutch, causing to be engaged the differential, and controlling rotation of the first motor. In some embodiments, in neutral mode, the method includes allowing the second motor to freewheel without electric power input.

In some embodiments, the method includes determining to achieve a neutral drive mode at the drive axis. The neutral drive mode is achieved by causing to be disengaged the first clutch, causing to be disengaged the second clutch, causing to be disengaged the differential, and allowing both the first motor and the second motor to freewheel without electric power input.

In some embodiments, the method includes determining a drive mode based on at least one of a signal from speed sensor, an energy consumption metric, an input to a user interface, a torque value of the first motor, or a torque value of the second motor.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

FIG. 19 is a flowchart of an illustrative process for managing an electric vehicle drivetrain, in accordance with some embodiments of the present disclosure.

DETAILED DESCRIPTION

The present disclosure is directed to motor drive unit architectures having a controllable differential. In some embodiments, the motor drive unit architecture aligns two or more motors on different axes. In some embodiments, the present disclosure is directed to drive units allowing a plurality of configurations to be realized. To illustrate, referencing a four-motor, torque vectoring capable, electric vehicle architecture (or a two-motor drive unit with torque vectoring to a pair of wheels at an axle), there may exist a large discrepancy between the amount of power and/or torque available from all four motors at any time and the amount of torque and/or power required to maintain a constant vehicle speed. Further, in situations where constant speed cruising is desired, it may be advantageous for efficiency, range, or both to use as few motors and drivetrains as possible. Electrical and/or mechanical means may be used to "turn off" or otherwise disengage as many of the other drivetrain systems, and reduce associated losses, as possible.

In some circumstances, dual drive units provide various advantages, including the ability to provide torque vectoring. The dual drive units of the present disclosure may provide one or more advantages. In some embodiments, the dual drive units of the present disclosure may be configured to fit into vehicles that are otherwise too small to fit the necessary hardware. This enables torque vectoring drive units to be appropriately packaged in smaller passenger vehicles. In some embodiments, the dual drive units of the present disclosure enable the use of relatively larger motors to fit in high performance applications that already employ torque vectoring drive units. This results in even more power in high output torque vectoring cars. In some embodiments, the dual drive units of the present disclosure enable the use of longer half shafts, which means more suspension travel is possible without compromising vehicle speed. Therefore, off-road applications or modes that require more suspension travel overall can be used at relatively higher speeds.

In some embodiments, the present disclosure is directed to a selectable differentiation gearbox which provides control over an operating range while providing torque vectoring, neutral differentiation, open-differentiation, single motor driving, and differential locking. In some embodiments, an electric drivetrain may include one or more electric motors configured to achieve torque vectoring (e.g., a two- or four-motor architecture). For example, a Front Drive Unit (FDU) and a Rear Drive Unit (RDU) may be included, and each may include two inverter cores, two motors, and two independent gearsets integrated into a single package.

Figure 1:
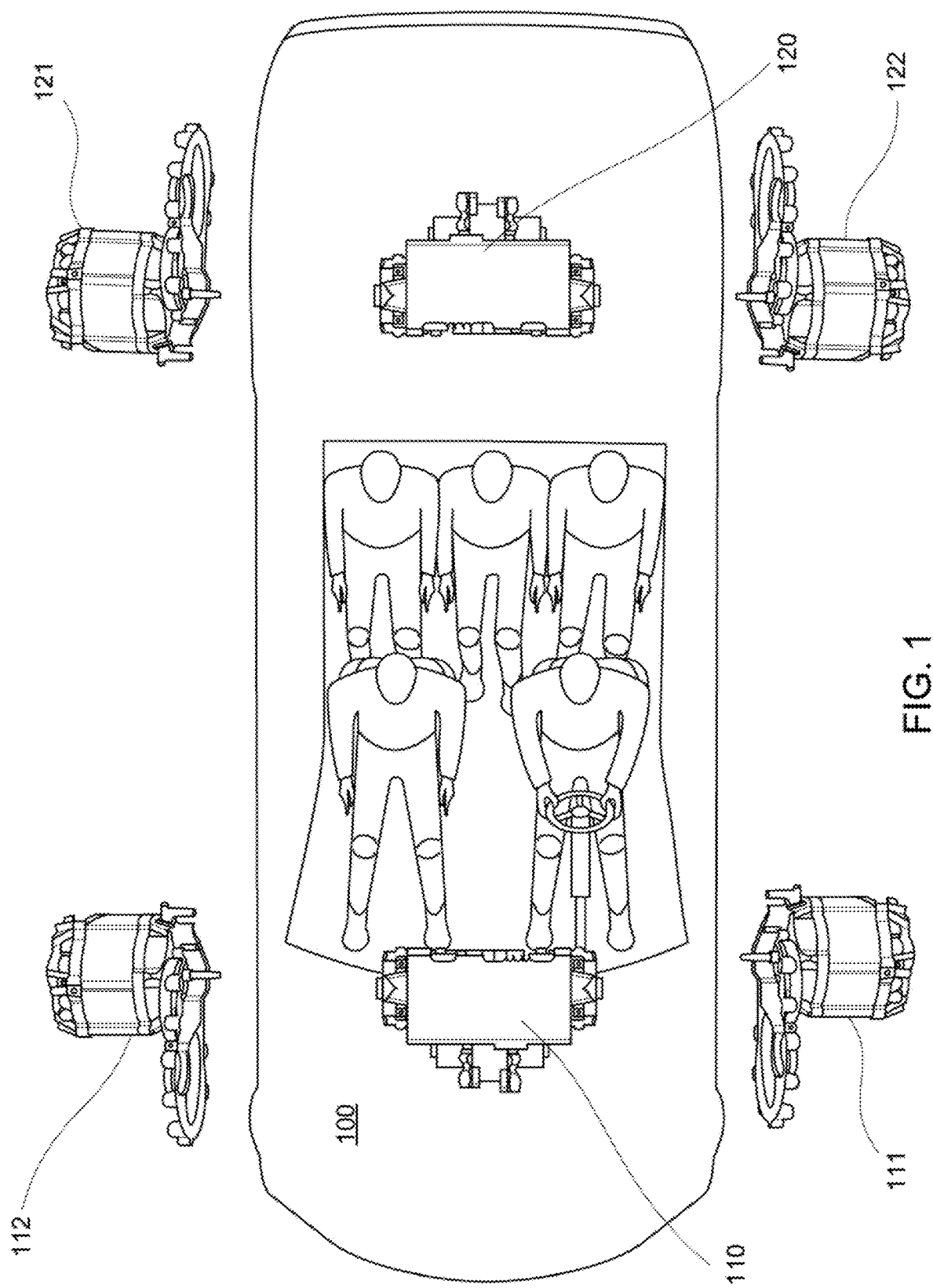
FIG. 1 shows a top view of illustrative components of an electric vehicle, in accordance with some embodiments of the present disclosure.

FIG. 1 shows a top view of illustrative components of electric vehicle 100, in accordance with some embodiments of the present disclosure. In some embodiments, a vehicle may include two or more electric motors, arranged in one or more drive units. For example, some of the motor assemblies may be identical, while some may have different handedness or shaft rotation direction relative to the motor. As illustrated, front drive unit 110 and rear drive unit 120 are oriented differently. The components and orientation of front drive unit 110 and rear drive unit 120 may be the same or different to accommodate suitable shaft rotations and fitment within the vehicle. Also illustrated in FIG. 1 is an exploded view of motor assembly 111, motor assembly 112, motor assembly 121, and motor assembly 122. Motor assemblies 111 and 112 are included in front drive unit 110 (e.g., along with other components such as a differential, intermediate housing, bearings, etc.). Motor assemblies 121 and 122 are included in rear drive unit 120 (e.g., along with other components such as a differential, intermediate housing, bearings, etc.). Front drive unit 110 and rear drive unit 120 may each include a differential, output shaft clutches, or both, to control the number of motors used, the number of output shafts driven, the independence of output shafts, or a combination thereof. For example, the differential and clutch assemblies of the present disclosure may be applied at the front wheels, rear wheels, or both. To illustrate, at each drive axis (e.g., front and rear), either zero, one, or two motors may be used to provide torque to wheels of the drive axis. For example, in some circumstances, only the front drive axis may be powered (e.g., one or both motors), and the rear drive axis may be neutralized (e.g., non-powered and allowed to freewheel). In a further example, in some circumstances, both the front drive axis and the rear drive axis may be powered (e.g., one or both motors at each axis). Table 1 provides illustrative examples of configurations that may be achieved by electric vehicle 100 wherein each of front drive unit 110 and rear drive unit 120 have differential assemblies included, in accordance with some embodiments of the present disclosure. In some embodiments, only one of front drive unit 110 and rear drive unit 120 include a differential, and only some of the configurations of Table 1 may be achievable or otherwise applicable.

TABLE 1

Illustrative configurations of a vehicle having two drive axes.

| Mode | FDU 110 | FDU 120 |
| --- | --- | --- |
| Full Torque Vectoring | Both motor assemblies 111 and 112 powered | Both motor assemblies 121 and 122 powered |
| Front Drive | Either or both of motor assemblies 111 and 112 powered | Both motor assemblies 121 and 122 unpowered |
| Rear Drive | Both motor assemblies 111 and 112 unpowered | Either or both of motor assemblies 121 and 122 powered |
| 4-wheel drive | Either or both of motor assemblies 111 and 112 powered | Either or both of motor assemblies 121 and 122 powered |

Figure 2:
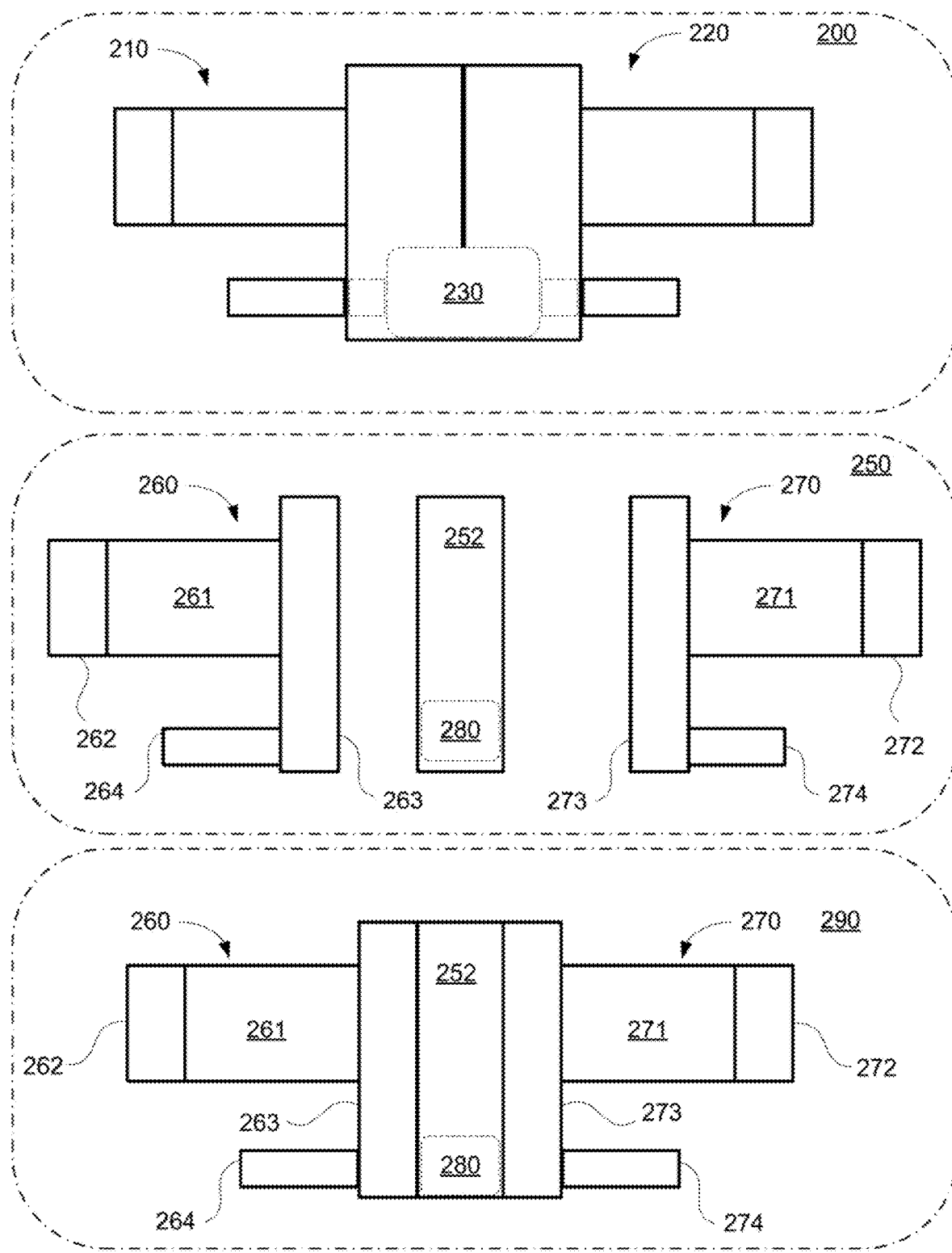
FIG. 2 shows three illustrative drive unit configurations, in accordance with some embodiments of the present disclosure.

FIG. 2 shows three illustrative drive unit configurations, in accordance with some embodiments of the present disclosure. Configuration 200 includes two separate motor drives 210 and 220, each including a motor, gearbox (e.g., a housing), and output (e.g., an output spline or output half-shaft). Differential assembly 230 is installed and configured to couple or decouple the output of motor drives 210 and 220. The housings of motor drives 210 and 220 interface to each other to form a stationary housing.

Configuration 250 includes motor drives 260 and 270, illustrated in an exploded view (e.g., unassembled). Motor drives 260 and 270 are configured to be coupled together by intermediate housing 252. In some embodiments, each of motor drives 260 and 270, while including a motor (e.g., motors 261 and 271), full gearset (e.g., gearsets 263 and 273), and output (e.g., half-shafts 264 and 274), need not be configured for stand-alone operation. As illustrated, motor drives 260 and 270 include, respectively, B-shields 262 and 272, which may be configured to house a bearing, manage electrical terminations, provide cooling, provide mounting, any other suitable functions, or any suitable combination thereof. In some embodiments, motor drives 260 and 270 need not be sealing. For example, intermediate housing 252 (e.g., I-shield) may be configured to seal against both motor drive 260 and motor drive 270. Intermediate housing 252 may be configured to seal lubricant (e.g., bearing oil), seal coolant (e.g., water, mixtures, oil), provide noise reduction (e.g., attenuate gear-induced audible noise and vibration), align motor drives 260 and 270 to each other, mount motor drives 260 and 270 to a frame or other structural element, house one or more shaft bearings (e.g., one or more bearings for a motor shaft, intermediate shaft, output shaft, or a combination thereof), any other suitable functionality, or any suitable combination thereof. Differential 280 is installed and configured to couple or decouple the output of motor drives 260 and 270.

Configuration 290 includes motor drives 260 and 270 in an assembled state. For example, motor drives 260 and 270 may be affixed to intermediate housing 252 using fasteners (e.g., bolts, threaded studs and nuts), clamps, latches, mechanical interlocks, any other suitable affixments, or any combination thereof. In some embodiments, intermediate housing 252, motor drive 260, motor drive 270, or a combination thereof may include alignment features that spatially align two or more components, constrain relative motion, or both. For example, intermediate housing 252 may allow each of motor drives 260 and 270 to be shorter (e.g., along the left-right axis, as illustrated in FIG. 2). In a further example, configuration 290 may be shorter than configuration 200 along the left-right axis, as illustrated, because motor drives 260 and 270 need not require fully sealed gearsets 263 and 273. Motor drives 210 and 220, which are stand-alone, include housings that completely seal against lubrication, coolant, or both, and also house all bearings of the respective gearsets.

Figure 3:
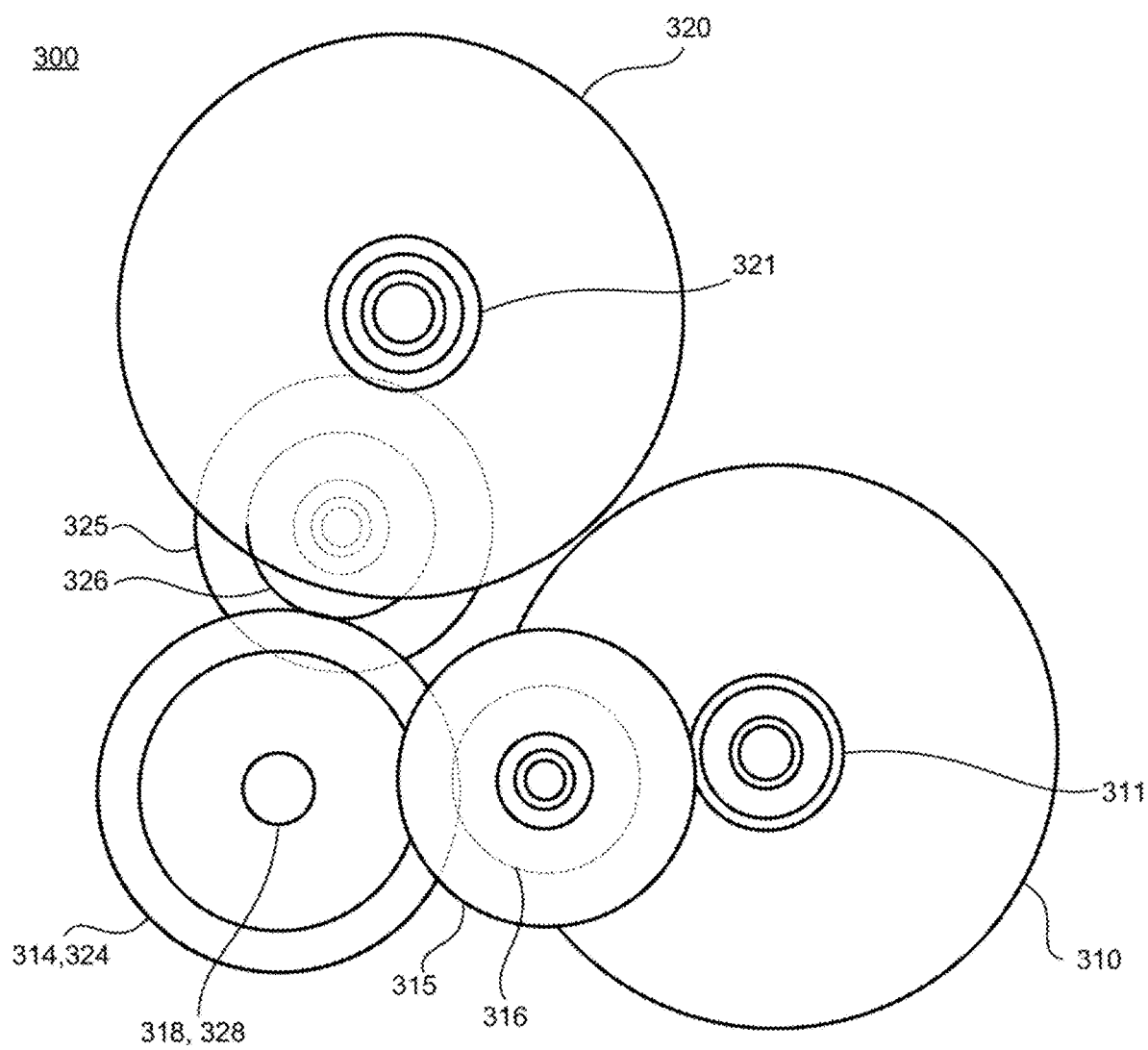
FIG. 3 shows an illustrative arrangement of gears within gearboxes, in accordance with some embodiments of the present disclosure.
Figure 8:
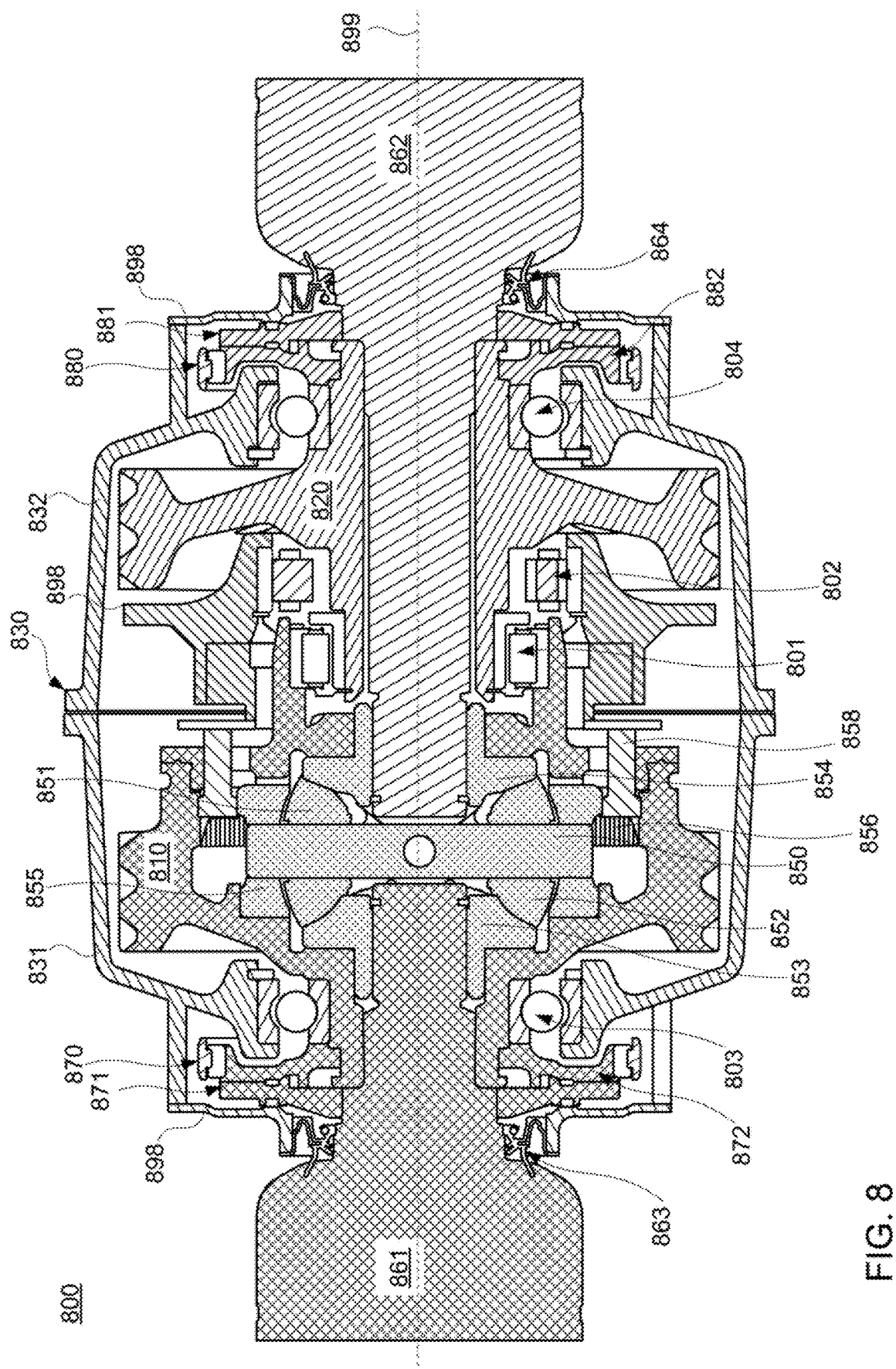
FIG. 8 shows a cross-sectional view of a drive system having a differential, in accordance with some embodiments of the present disclosure.

FIG. 3 shows an illustrative arrangement 300 of gears within gearboxes, in accordance with some embodiments of the present disclosure. Gearbox housings are not illustrated in FIG. 3 for clarity. Power train mechanisms, such as gearboxes, can assume various configurations and arrangements based on, for example, design constraints. For example, as illustrated in FIG. 3, the motors and intermediate gears are offset from each other for purposes of illustration and clarity. Accordingly, in some embodiments, the motors and output shafts are aligned on respective axes (e.g., as illustrated in FIG. 8). The motors, output gears, or both, may be aligned on respective axes, in accordance with the present disclosure (e.g., first gears 311 and 321 may be centered about the same axis). To illustrate, the offset arrangement of FIG. 3 allows each power transfer mechanism to be illustrated (e.g., illustrated as a "V", however the minor angle of the "V" may be zero degrees to form a motor-aligned arrangement).

As illustrated in FIG. 3, each gearset (e.g., gears 311, 315, 316, and 314 are one gearset, and gears 321, 325, 326, and 324 are another gearset) includes a double reduction gear. Each motor (e.g., motor 310 and motor 320), includes a motor shaft having a first gear. For example, first gear 311 is affixed to the shaft of motor 310, and first gear 321 is affixed to the shaft of motor 320. Each first gear pairs with a larger of two intermediate gears that rotate about an intermediate axis. For example, first gear 311 engages with intermediate gear 315 affixed to an intermediate shaft. Intermediate gear 316, coupled to the same intermediate shaft as intermediate gear 315 engages with respective output gear 314 (e.g., coupled to a respective output shaft 318). Further, first gear 321 engages with intermediate gear 325 affixed to an intermediate shaft. Intermediate gear 326, coupled to the same intermediate shaft as intermediate gear 325 engages with respective output gear 324 (e.g., coupled to a respective output shaft 328, aligned with output shaft 318). It will be understood that, as illustrated in FIG. 3, output gears 314 and 324 are aligned, with output gear 324 being positioned behind output gear 314, and only output shaft 318 visible. As described herein, the intermediate shafts may be offset (e.g., not aligned along a line) from the respective motor shaft and drive shaft. It will be understood that any suitable number of gears may be used with any suitable amount of reduction between a motor and corresponding output shaft. In some embodiments, the gearbox may include two or more gears in a gear train. The gear train may include an ordinary gear train or a compound ordinary gear train. For example, a compound gear train may include two gears configured to rotate about a single axis. Gears may include any suitable gear types such as, for example, spur gears, parallel helical gears, any other suitable gear type, or any suitable combination thereof. It will be understood that while the illustrative drive units of the present disclosure are illustrated as including gearboxes and gears, any suitable power transfer mechanisms may be used to transfer power from a motor to an output, in accordance with the present disclosure. For example, chain drives, belt drives may be used. In a further example, a belt tensioner, cog, sprocket, any other suitable hardware, or combination thereof, may be included to transfer power, maintain engagement, or both. In a further example, any suitable number of reductions may be included in a power transfer mechanism. As illustrated, two reduction stages are included using three total gears, however a gear set may include two gears, three gears, or more than three gears, for example. In some embodiments, a power transfer mechanism (e.g., either gearset of FIG. 3) is configured to reduce a rotation rate of an output shaft (e.g., an output shaft) relative to a rotation rate of a motor shaft. As used herein, a power transfer mechanism may refer to one or more components for transmitting shaft work among shafts. For example, a power transfer mechanism may include a gearset (e.g., a plurality of gears, each engaged with at least one other gear), a single gear (e.g., engaged with other gears such as an input gear and an output gear), bearings, any other suitable components, or any combination thereof. For example, the set of a motor gear, an intermediate gear, and an output gear may be referred to as a power transfer mechanism, or the intermediate gear alone may be referred to as a power transfer mechanism.

Figure 4:
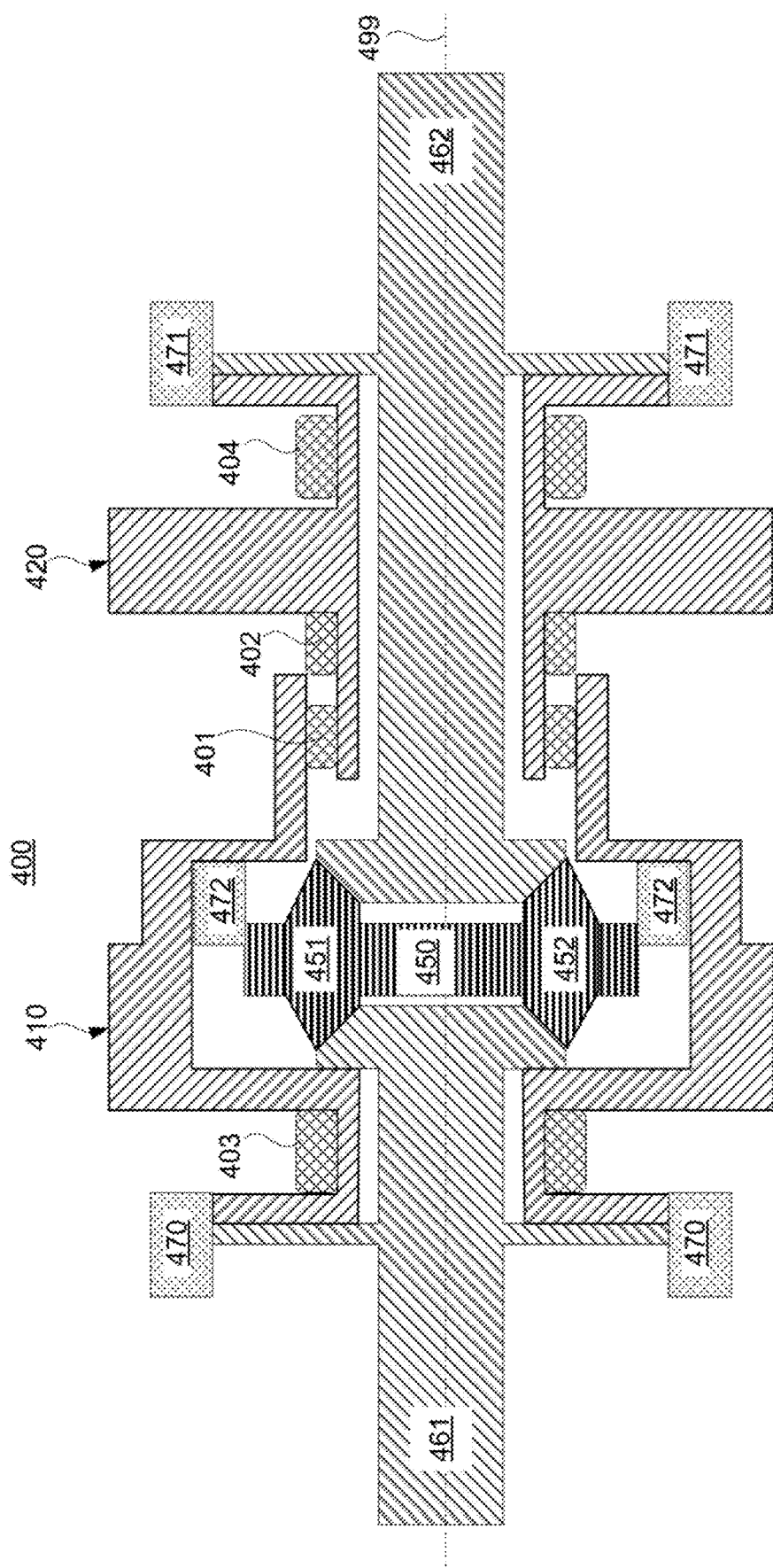
FIG. 4 shows a cross-sectional view of an illustrative arrangement for nested drive gears, clutch assemblies, and a differential assembly, in accordance with some embodiments of the present disclosure.

FIG. 4 shows a cross-sectional view of illustrative arrangement 400 for nested drive gears, clutch assemblies, and a differential assembly, in accordance with some embodiments of the present disclosure. To illustrate, arrangement 600 may be, but need not be, similar to arrangement 300 of FIG. 3 with addition of clutch assemblies and a differential assembly. Arrangement 400, as illustrated, represents a portion of a drivetrain and includes drive gear 410, drive gear 420, bearings 401-404, clutch assemblies 470 and 471, output elements 461 and 462, and differential elements 450-452 with actuator 472 (e.g., to lock and unlock drive gear 410 from differential elements 451). Drive gear 410 is driven by a first motor (e.g., in a similar arrangement as illustrated in FIGS. 2-3) and drive gear 420 is driven by a second motor (e.g., in a similar arrangement as illustrated in FIGS. 2-3). Bearings 401-404 maintain alignment of drive gears 410 and 420 along axis 499 during rotation and loading (e.g., axial loading, radial loading, and azimuthal loading). As illustrated, drive gear 420 nests radially within drive gear 410 along a section, with bearing 401 arranged radially in between. As illustrated, bearings 402-404 are arranged between rotating components and stationary elements of the gearbox housing (not shown in FIG. 4). Clutch assembly 470 is configured to engage and disengage drive gear 410 from output element 461. Similarly, clutch assembly 471 is configured to engage and disengage drive gear 420 from output element 462. Each of clutch assemblies 470 and 471 may include an actuator that is mounted to the stationary elements of the housing (not shown in FIG. 4). Actuator 470 is configured to engage and disengage drive gear 410 from differential elements 450-452. In some embodiments, differential element 450 includes a differential casing that can be engaged with (e.g., rotate with) drive gear 410 or disengaged from (e.g., rotate differently from) drive gear 410.

Bearings 401-404 may include, for example, roller bearings, needle bearings, ball bearings, taper bearings, thrust bearings, any other suitable type of bearing, or any combination thereof. In some embodiments, bearings 403 and 404 are configured to react against a stationary component (e.g., a housing or other component) to maintain alignment of drive gears 410 and 420 relative to the stationary component. In some embodiments, bearing 402 is configured to react against a stationary component (e.g., a housing or other component) to maintain alignment of drive gear 420 relative to the stationary component. Because of the axial overlap of drive gears 410 and 420, bearing 401 may be configured to transmit forces in the radial direction, axial direction, or both, between drive gears 410 and 420.

Drive gears 410 and 420 (also referred to as "output gears") are configured to engage with respective bearings 403 and 404, which engage with a stationary component (e.g., a housing) to maintain alignment of drive gears 410 and 420. As illustrated, drive gear 410 and output element 461 may be referred to as "left (L)" for "1" while drive gear 420 and output element 462 may be referred to as "right (R)" or "2" herein. In some embodiments, output elements 461 and 462 each include a side gear (e.g., engaged with differential elements 451 and 452), a half shaft and a clutch element that is configured to be engaged and disengaged from respective drive gears 410 and 420 by respective clutch assemblies 470 and 471. In some embodiments, output elements 461 and 462 are each configured to be outputs, and may include output interfaces. For example, output elements 461 and 462 each may include a recess configured to accommodate a half shaft. In a further example, output elements 461 and 462 each may include any suitable output interface such as, for example, a splined interface, a keyed interface, a flanged interface (e.g., with fasteners), a universal joint, a clutched interface, any other suitable interface, or any combination thereof. In an illustrative example, the differential assembly may be referred to as a center disconnecting differential that is coupled to output elements 461 and 462, and is configured to connect and disconnect (e.g., via actuator 472) drive gear 410 from differential element 451 (e.g., which includes a differential casing).

Clutch assemblies 470 and 471 of bearing arrangement 400 is configured to mechanically couple drive gears 410 and 420 with respective output elements 461 and 462. Clutch assemblies 470 and 471 may include, for example, friction plates, pressure plates, actuators (e.g., hydraulic, electromechanical, mechanical), centrifugal elements, conical elements, a torque limiter, dampers, springs (e.g., to reduce chatter, to release engagement), dog clutch elements (e.g., for non-slip engagement), any other suitable elements, or any combination thereof. Clutch assemblies 470 and 471 may partially interface to a stationary component (e.g., a housing or extension thereof), which provides a structure to transmit force. For example, a linear actuator may be used to engage the clutch assembly, and a stator of the linear actuator may be affixed to the stationary component. In a further example, an engagement mechanism of the clutch assembly may be affixed to the stationary component to provide a structure against which the engagement mechanism reacts a force.

In an illustrative example, in torque vectoring mode, drive gears 410 and 420 may rotate about axis 499 as substantially the same speed when the vehicle is traveling straight on relatively consistent ground. During turning or under condition where one side may experience more traction or more slip, drive gears 410 and 420 may rotate at different speeds about axis 499 (e.g., drive gears 410 and 420 rotate relative to each other about axis 499). In some such circumstances, for example, wherein one wheel experiences slip, the differential assembly may be engaged to transmit more power to the wheel with more traction.

Figure 5:
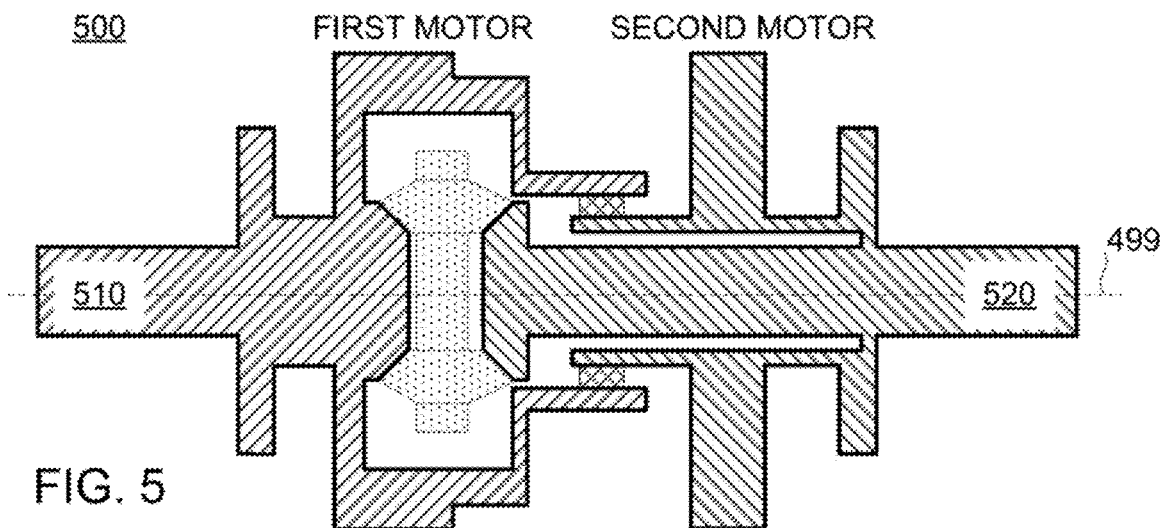
FIGS. 5-7 show cross-sectional views of the illustrative arrangement of FIG. 4 in different driving modes, in accordance with some embodiments of the present disclosure.
Figure 6:
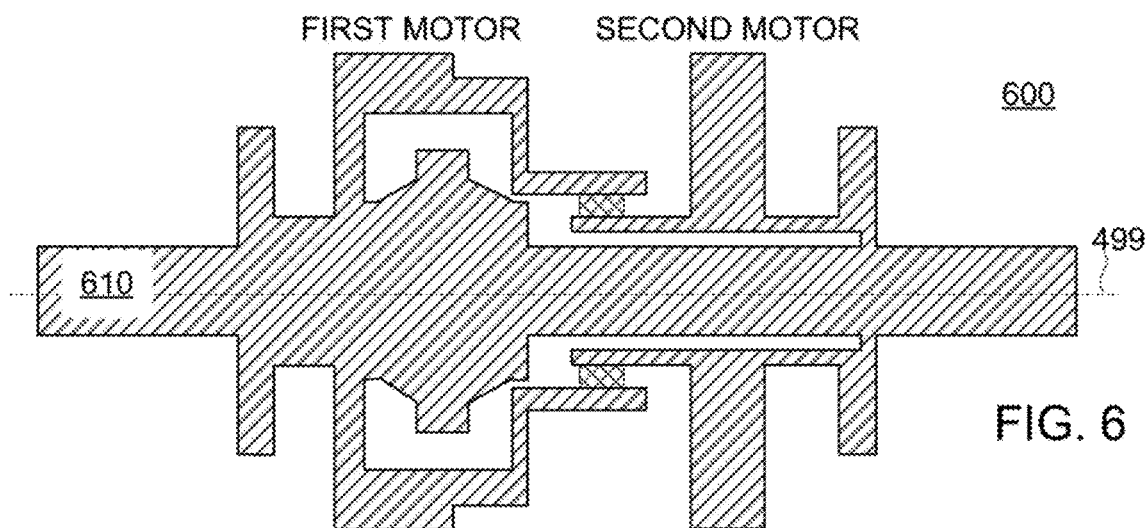
Figure 7:
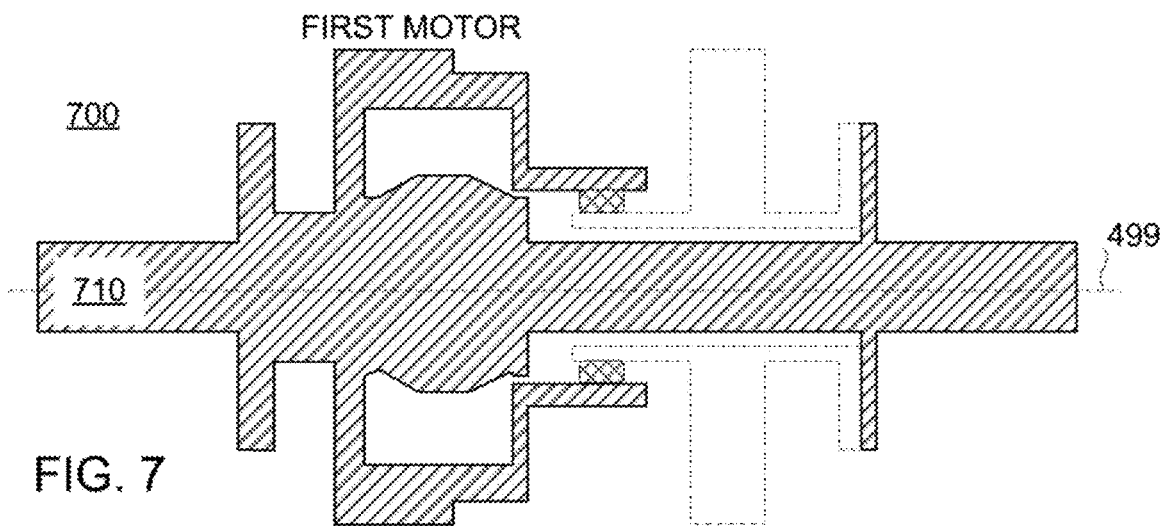

FIGS. 5-7 show cross-sectional views of illustrative arrangement 400 of FIG. 4 in different driving modes, in accordance with some embodiments of the present disclosure. FIG. 5 illustrates a torque vectoring mode, FIG. 6 illustrates a fully locked mode, and FIG. 7 illustrates a single motor mode. Additionally, a neutral mode may be achieved, wherein the differential assembly and clutch assemblies are disengaged, and thus the drive axis is not driven by either motor (e.g., rotates passively when the other drive axis is driven). Axis 499 of FIG. 4 is included in each of FIGS. 5-7 for reference.

Referencing FIG. 5, illustrating a torque vectoring mode, output 510 is driven by the first motor and output 520 is driven by the second motor. The differential assembly is unlocked (e.g., shown as dotted in FIG. 5, with actuator 472 disengaged), while both clutch assemblies 470 and 471 are locked. For example, in torque vectoring mode, each motor drives the respective output (e.g., output elements 461 and 462) independent from each other. In a further example, the first motor only drives output 510 and the second motor only drives output 520, and each of outputs 510 and 520 may rotate at different speeds and exhibit a different amount of torque (e.g., outputs 510 and 520 are hashed differently in FIG. 5).

Referencing FIG. 6, illustrating a fully locked mode, the differential assembly is disengaged (e.g., via actuator 472) and both clutch assemblies 470 and 471 are engaged such that output 610 (e.g., including both output shafts to both wheels) is driven by the first motor, the second motor, or both. Unlike the torque vectoring mode of FIG. 5, the output shafts are not free to rotate independently (e.g., wheels of the drive axis rotate at the same speed), and either or both motors may be used to drive output 610. To illustrate, if one wheel were to slip in fully locked mode, the torque provided by both the first motor and the second motor could be utilized by the non-slipping wheel in fully locked mode.

Referencing FIG. 7, illustrating a single motor mode, both clutch assemblies 470 and 471 are disengaged and the differential assembly is engaged (e.g., via actuator 472). As illustrated, only the first motor drives output 710. The second motor may freewheel but is otherwise not engaged with output 710 and does not provide torque to output 710 (e.g., except perhaps negligible friction from relative moving surfaces and viscous drag). In single motor mode, for example, a single motor is used to drive the wheels on the drive axis, thus reducing the electrical power requirements for that drive axis.

FIG. 8 shows a cross-sectional view of drive system 800 having a differential, in accordance with some embodiments of the present disclosure. As illustrated, drive system 800 includes: housing 830 including housing elements 831 and 832, and stationary elements 898; output gears 810 and 820; spider gears 851 and 852; shaft 850 and frame 855; side gears 853 and 854; differential actuator 858; halfshafts 861 and 862, possibly also referred to as output shafts 861 and 862 and/or halfshafts to constant velocity joints 861 and 862; clutch elements 871, 872, 881, and 882; clutch actuators 870 and 880; bearings 801, 802, 803, and 804; and seals 863 and 864.

Housing 803 is configured to be stationary relative to output gears 810 and 820, and may be mounted to a frame of an electric vehicle, for example. Output gears 810 and 820 are engaged with respective gears (not shown) that may be either motor gears or intermediate gears engaged with motor gears. Further, although not illustrated in FIG. 8, two electric motors are included and coupled to housing 830, with respective motor shafts engaged via respective motor gears to drive gears 810 and 820, either directly or via one or more respective intermediate gears. Output shafts 861 and 862 (e.g., referred to as "halfshafts" herein) may be coupled to respective wheels of the drive axis by a universal joint, half shaft, spindle, any other suitable linkage, or any combination thereof. Seals 863 and 864 are configured to seal output shafts 861 and 862 to housing 830 to allow azimuthal displacement (e.g., rotation about axis 899) while preventing or limiting leakage of lubricant from the inner volume of housing 830. To illustrate, drive system 800 may include an oil lubricating system wherein oil is pumped and/or splashed on components arranged within housing 830, and seals 863 and 864 help contain the lubricant in the inner volume of housing 830.

Output gear 810 interfaces to bearings 801 and 803 to constrain displacement off of axis 899 (e.g., output fear 810 is constrained to a single degree of freedom to rotate about axis 899). To illustrate, output gear 810 may be a single piece or a rigid assembly of more than one piece. For example, as illustrated, output gear 810 includes a first piece that is driven and interfaces to clutch element 872 and a second piece that interfaces to bearing 801. Output gear 820 interfaces to bearings 801, 802, and 804 to constrain displacement off of axis 899 (e.g., output gear 820 is constrained to a single degree of freedom to rotate about axis 899). Output gears 810 and 820 may rotate about axis 899 relative to each other in some drive modes (e.g., torque vectoring mode, single motor mode, neutral mode), and may be constrained to rotate together (e.g., at the same speed) in some drive modes (fully locked mode).

Clutch element 871 (e.g., a clutch disk) is affixed to output shaft 861 (e.g., by splines, keys, or any other suitable affixment constraining relative azimuthal rotation). Clutch element 872 (e.g., a clutch disk) is affixed to drive gear 810 (e.g., by splines, keys, or any other suitable affixment constraining relative azimuthal rotation). Clutch actuator 870 is configured to engage and disengage clutch elements 871 and 872 from each other, thus engaging or disengaging output gear 810 and output shaft 861 from each other. To illustrate, when clutch actuator 870 causes clutch elements 871 and 872 to be engaged, output gear 810 and output shaft 861 rotate at the same angular rate and torque is transferred between output gear 810 and output shaft 861. In some embodiments, some slip may occur between clutch elements 871 and 872 when engaged, although slip need not be exhibited in other embodiments.

Clutch element 881 (e.g., a clutch disk) is affixed to output shaft 862 (e.g., by splines, keys, or any other suitable affixment constraining relative azimuthal rotation). Clutch element 882 (e.g., a clutch disk) is affixed to drive gear 820 (e.g., by splines, keys, or any other suitable affixment constraining relative azimuthal rotation). Clutch actuator 880 is configured to engage and disengage clutch elements 881 and 882 from each other, thus engaging or disengaging output gear 820 and output shaft 862 from each other. To illustrate, when clutch actuator 880 causes clutch elements 881 and 882 to be engaged, output gear 820 and output shaft 862 rotate at the same angular rate and torque is transferred between output gear 820 and output shaft 862. In some embodiments, some slip may occur between clutch elements 881 and 882 when engaged, although slip need not be exhibited in other embodiments.

Drive system 800 includes a differential assembly (e.g., a center disconnecting differential) that includes spider gears 851 and 852, shaft 850, frame 855, side gears 853 and 854, and differential actuator 858. Frame 855 and shaft 850 may also be referred to as a differential casing, which may be engaged to rotate with output gear 810 or rotate different from output gear 810. Side gear 853 is affixed to output shaft 861 (e.g., splined, keyed or bolted together) and is configured to rotate with output shaft 861. Side gear 854 is affixed to output shaft 862 (e.g., splined, keyed or bolted together) and is configured to rotate with output shaft 862. Spider gears 851 and 852 are configured to rotate about shaft 850. In some embodiments, frame 855 is affixed to shaft 850, while in other embodiments, frame 855 and shaft 850 may include a single component. Differential actuator 858 is configured to engage and disengage output gear 810 and frame 855. As illustrated, differential actuator 858 is engaged, and thus frame 855, shaft 850, and spider gears 851 and 852 rotate with output gear 810 about axis 899. Further as illustrated, output gear 810 includes splines 856, which are configured to engage with differential actuator 858. Although not visible in FIG. 8, frame 855 includes corresponding splines such that, in the configuration illustrated in FIG. 8, differential actuator 858 also engages splines of frame 855 such that frame 855 and output gear 810 rotate together. The assembly including spider gears 853 and 854, shaft 850, and frame 855 is referred to herein as a spider gearset, which may rotate about axis 899. In an illustrative example, the differential assembly couples output shafts 861 and 862 together (e.g., and is configured to differentiate torque to output shafts 861 and 862), and differential actuator 858 is configured to connect and disconnect output gear 810 from frame 855 (e.g., a differential casing).

Bearings 803 and 804, as illustrated, are arranged between housing 830 (e.g., housing elements 831 and 832, respectively) and respective output gears 810 and 820 (e.g., extensions thereof such as surfaces machined to accommodate bearing journals). Bearings 803 and 804 constrain radial and axial displacement relative to axis 899, while allowing azimuthal displacement (i.e., rotation about axis 899). Bearing 801 is arranged between output gear 810 and output gear 820, thus constraining relative radial displacement, while allowing relative azimuthal displacement (e.g., relative rotation). Bearing 802 is arranged between output gear 820 and stationary component 898 of housing 830, thus constraining radial displacement, at least, of output gear 820 while allowing azimuthal displacement (e.g., rotation about axis 899).

Figure 9:
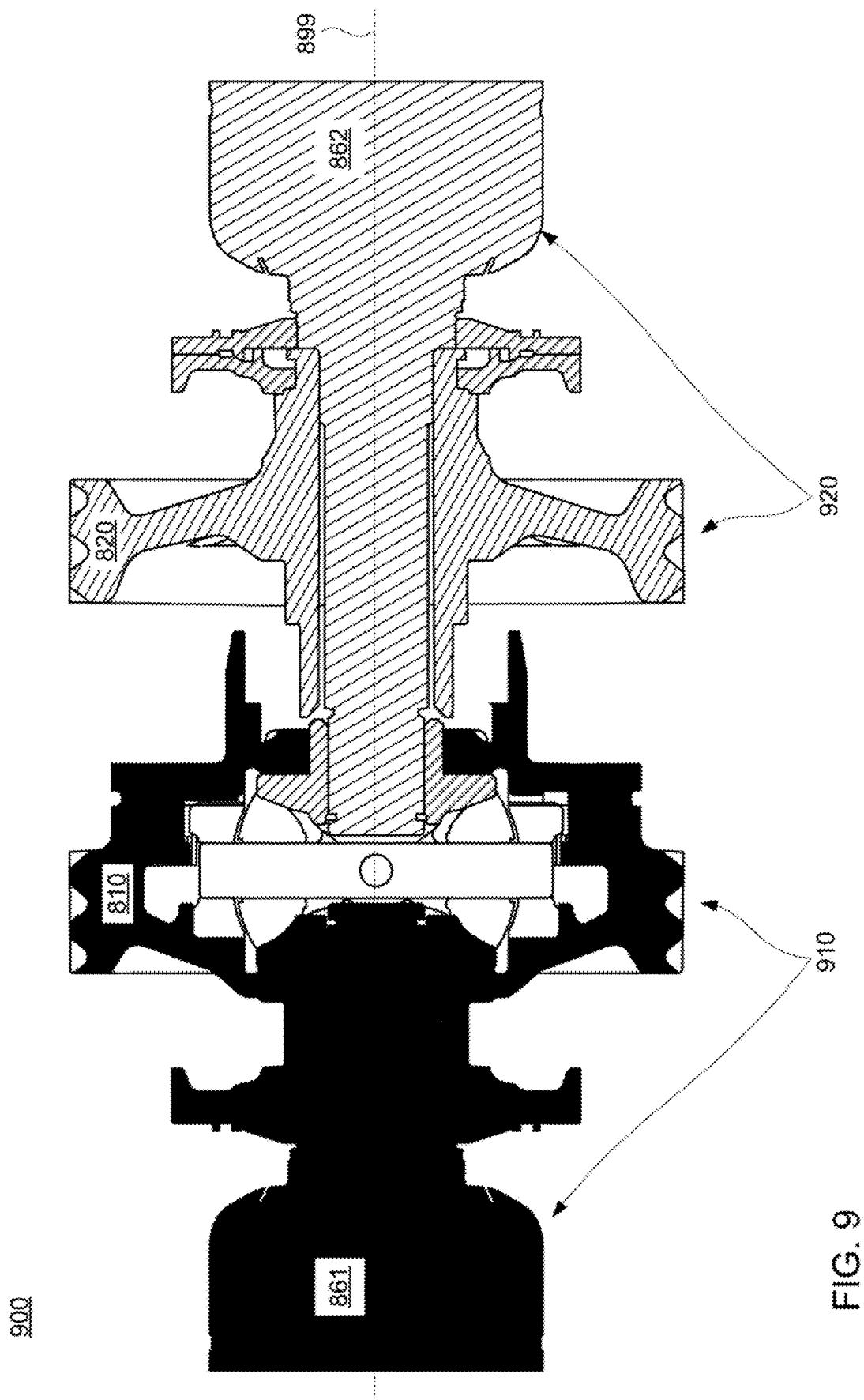
FIGS. 9-11 show cross-sectional views of the illustrative drive system of FIG. 8 in different driving modes, in accordance with some embodiments of the present disclosure.
Figure 10:
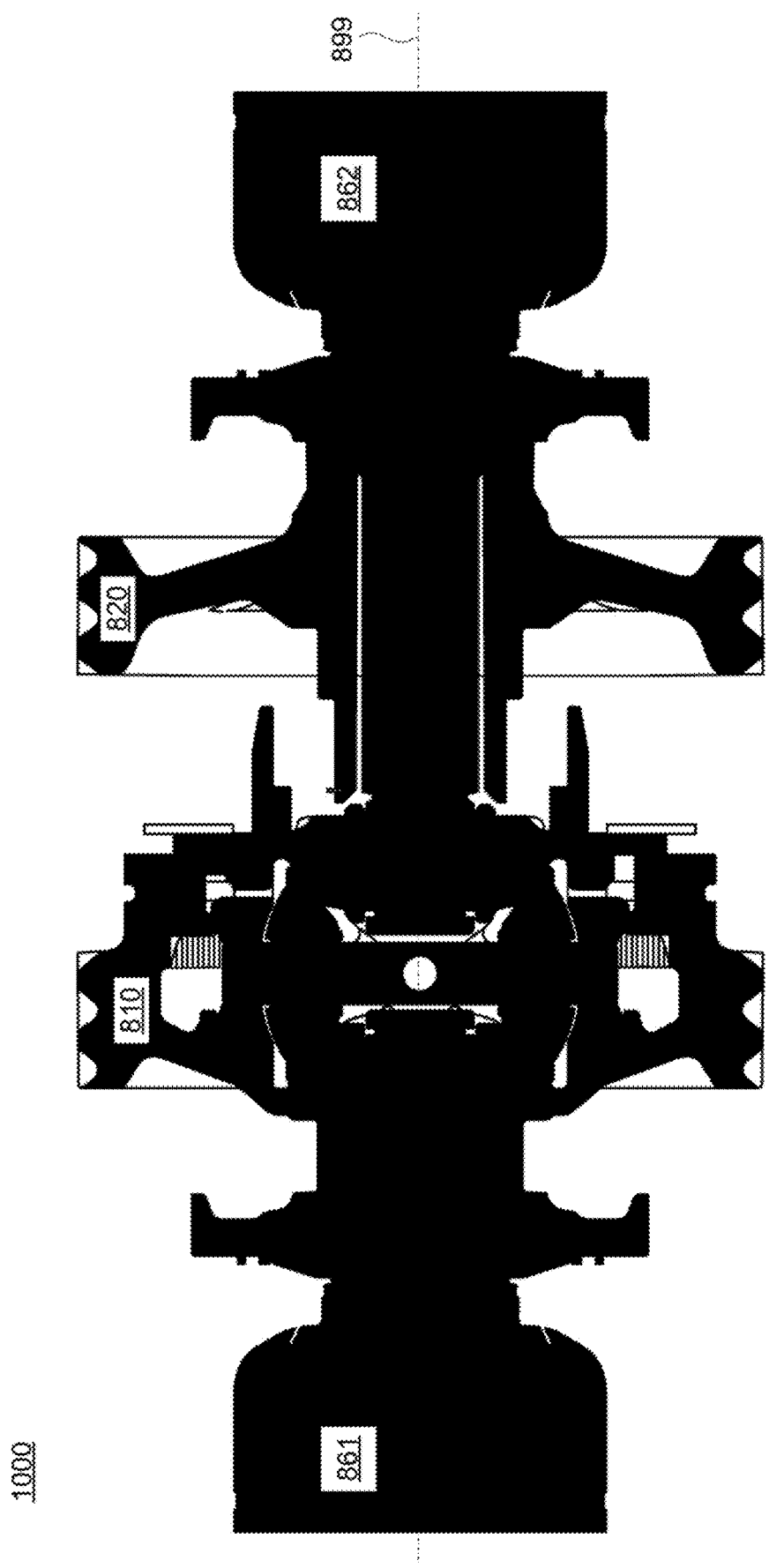
Figure 11:
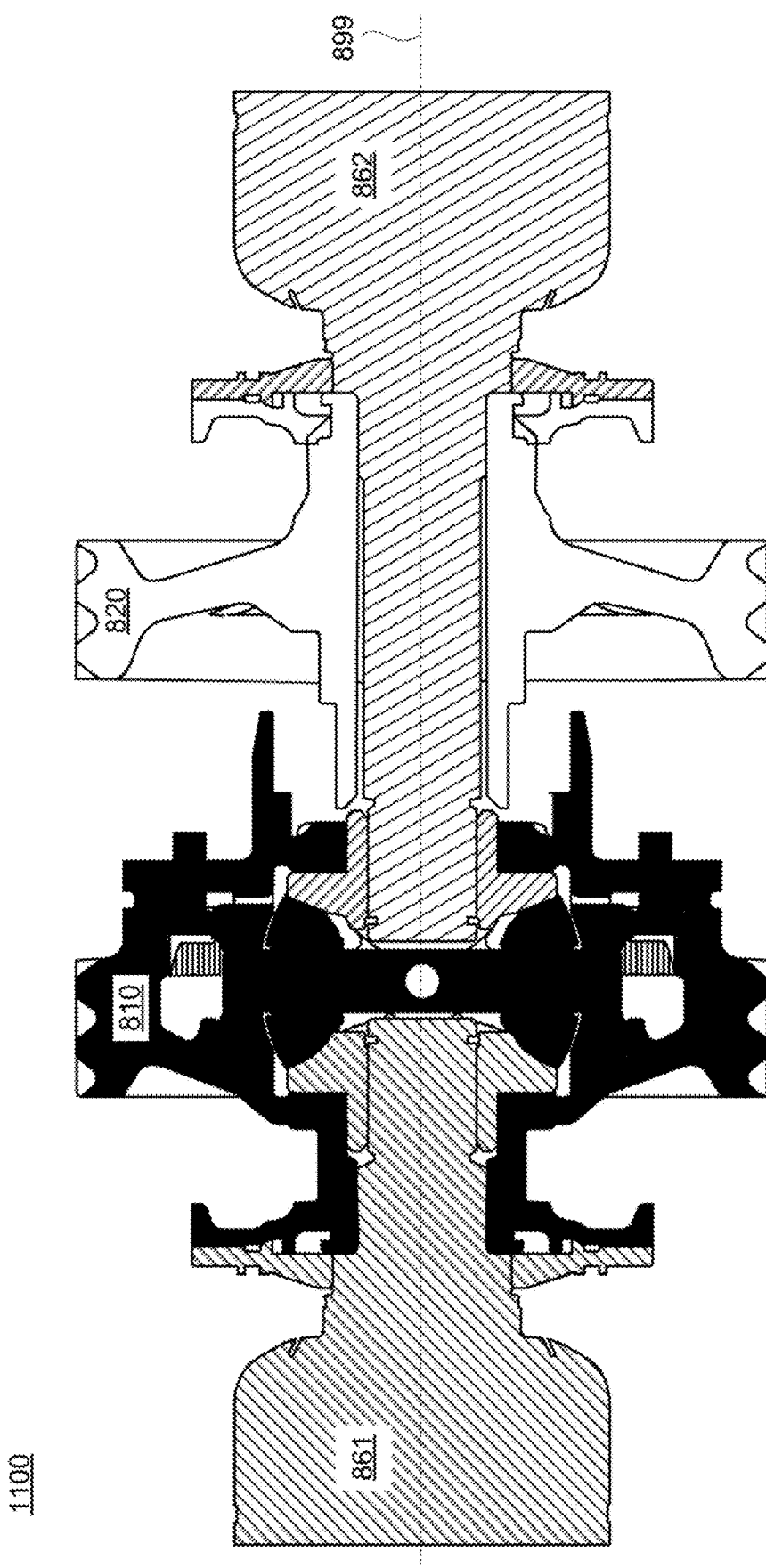

FIGS. 9-11 show cross-sectional views of illustrative drive system 800 of FIG. 8 in different driving modes, in accordance with some embodiments of the present disclosure. Not all of the labels of FIG. 8 are not included in FIGS. 9-11 for purposes of clarity, and bearings, housings, clutch actuators, seals, and other features are omitted for purposes of clarity. Hatching is used in FIGS. 9-11 to illustrate components constrained to rotate as rigid bodies, and components exhibiting potential relative rotation. In an illustrative example, the drive modes illustrated in FIGS. 9-11 correspond to the drive modes of FIGS. 5-7, respectively.

Referencing FIG. 9, illustrating a torque vectoring mode, output gear 810 is driven by the first motor and output gear 820 is driven by the second motor. The differential assembly is unlocked (e.g., frame 855 is disengaged from output gear 810), while both clutch assemblies are locked at least some of the time (clutch elements 871 and 872 are engaged with each other, and clutch elements 881 and 882 are engaged with each other). Output 861 is driven by output gear 810, when clutch elements 871 and 872 are engaged, while output 862 is driven by output gear 820, when clutch elements 881 and 882 are engaged. For example, in torque vectoring mode, each motor (e.g., a first and second motor) drives the respective output (e.g., outputs 861 and 862) independent from each other. To illustrate, the first motor only drives output gear 810 and the second motor only drives output gear 820, and each of output gears 810 and 820 may rotate at different speeds and exhibit a different amount of torque. Frame 855, shaft 850, and spider gears 851 and 852 may rotate about axis 899 relative to both locked components 910 and 920 (e.g., the differential is disengaged). Accordingly, spider gears 851 and 852 rotate about the axis of shaft 850 if outputs 910 and 920 rotate at different angular rates.

Referencing FIG. 10, illustrating a fully locked mode, the differential assembly and both clutch assemblies are engaged such that both output shafts 861 and 862 are driven as a rigid body by the first motor, the second motor, or both. Unlike the torque vectoring mode of FIG. 9, output shafts 861 and 862 are not free to rotate independently (e.g., wheels of the drive axis rotate at the same speed), and either or both motors may be used to drive the wheels. To illustrate, if one wheel were to slip in fully locked mode, the torque provided by both the first motor and the second motor could be utilized by the non-slipping wheel in fully locked mode. To illustrate further, spider gears 851 and 852 do rotate about the axis of shaft 850 because both side gears 853 and 854 are constrained to rotate together (e.g., as part of the rigid body).

Referencing FIG. 11, illustrating a single motor mode, both clutch assemblies are disengaged and the differential assembly is engaged. The single motor mode (also referred to as hyper-mile mode or eco mode) allows the front drive unit to be reduced from two motors and gearsets being active, to a single motor and gearset being used for powering a drive axis (e.g., both front wheels or both rear wheels). Only the first motor, which drives output gear 810, drives output shafts 861 and 862 in single motor mode. The second motor, which drives output gear 820 in some other drive modes, may freewheel but is otherwise not engaged with, and does not provide torque to, output shafts 861 or 862. In single motor mode, for example, a single motor is used to drive the wheels on the drive axis (e.g., along axis 899), thus reducing the electrical power requirements for that drive axis (e.g., incurring less motor, power electronics, and/or power transmission loss). Differential actuator 858 is engaged, and thus frame 855 and shaft 850 rotate about axis 899 with output gear 810. However clutch actuators 870 and 880 are not engaged (i.e., are disengaged) and thus side gears 853 and 854 are driven by spider gears 851 and 852. Accordingly, output shafts 861 and 862 may, but need not, rotate at the same angular rate. For example, during driving along a straight path, output shafts 861 and 862 rotate at the same speed, and spider gears 851 and 852 do not rotate relative to the axis of shaft 850. In a further example, during driving along a turn or surface with mismatched friction/grip, output shafts 861 and 862 may rotate at different speeds, in which case spider gears 851 and 852 rotate relative to the axis of shaft 850. Output gear 820 is not engaged with output shaft 862 (or output shaft 861), and may freewheel, for example (e.g., or may incidentally rotate from viscous drag as output shaft 862 rotates).

Figure 12:
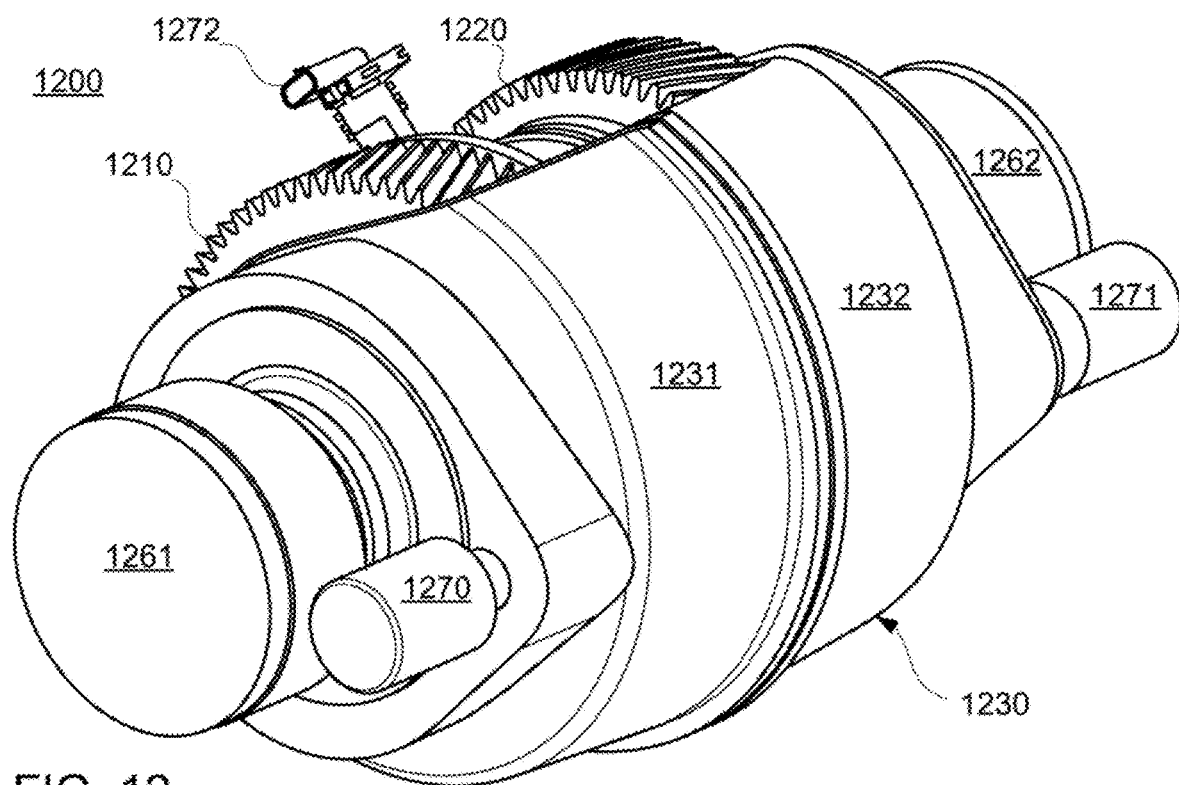
FIG. 12 shows a perspective partial cross-sectional view of an illustrative drive system, in accordance with some embodiments of the present disclosure.

FIG. 12 shows a perspective partial cross-sectional view of illustrative drive system 1200, in accordance with some embodiments of the present disclosure. FIG. 12 illustrates the external surface of housing 1230, having housing elements 1231 and 1232 joined together. Further, FIG. 12 illustrates a cut-away view, wherein some of housing 1230 is cut-away to expose output gears 1210 and 1210. As illustrated, drive system 1200 includes housing 1230, output gears 1210 and 1220 (e.g., driven by respective motors), differential actuator 1272, clutch actuators 1270 and 1271, and output shafts 1261 and 1262. In an illustrative example, drive system 1200 may be the same as drive system 800 of FIGS. 8-11.

Figure 13:
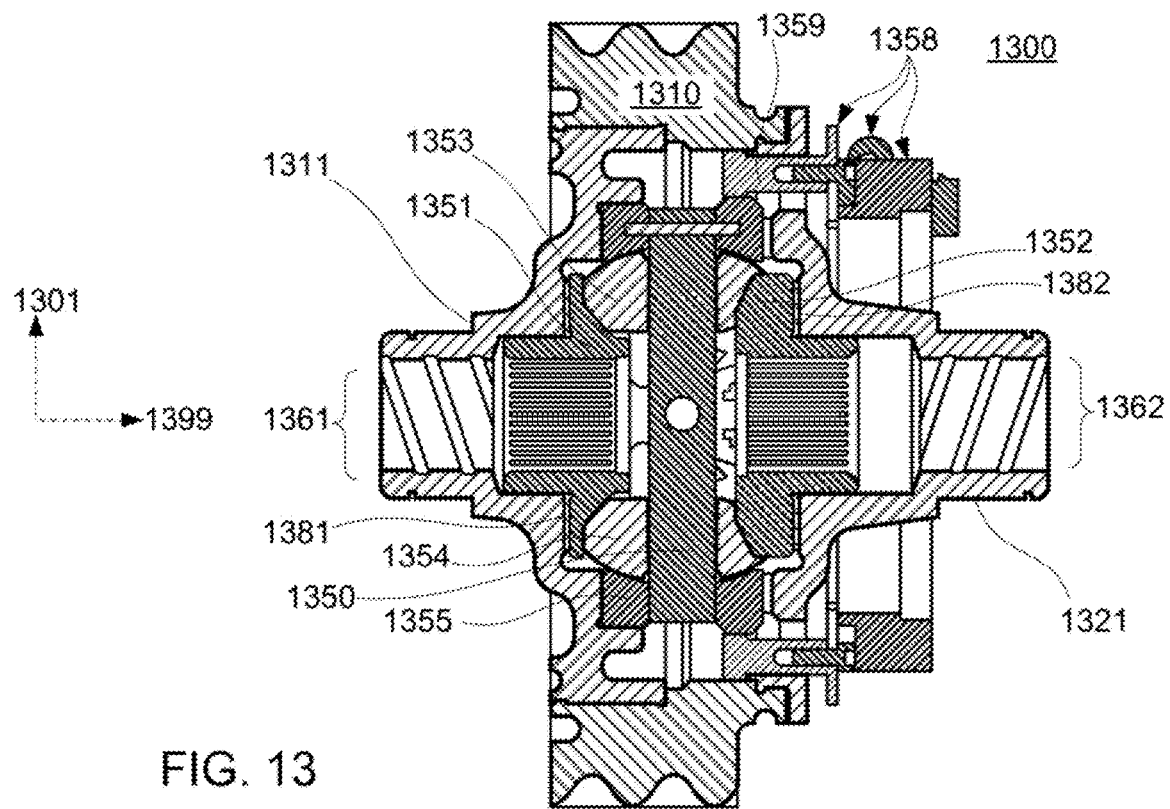
FIG. 13 shows a cross-sectional view of a portion of an illustrative drive system having an integrated differential, in accordance with some embodiments of the present disclosure.

FIG. 13 shows a cross-sectional view of a portion of illustrative drive system 1300 having an integrated differential, in accordance with some embodiments of the present disclosure. As illustrated, output gear 1310 includes extensions 1311 and 1321, although it will be understood that an output gear may be a single piece, or an assembly of pieces configured to rotate about axis 1399 as a rigid body. For example, extensions 1311 and 1321 rotate as a rigid body with the rest of output gear 1310. As illustrated, drive system 1300 includes a differential assembly that includes spider gears 1351 and 1352, shaft 1350, frame 1355, side gears 1353 and 1354, and differential actuator 1359. Side gear 1353 is configured to be affixed to an output shaft (not shown) engaged with interface 1361 (e.g., splined, keyed or bolted together) and is configured to rotate with the output shaft. Side gear 1354 is configured to be affixed to an output shaft (not shown) engaged with interface 1362 (e.g., splined, keyed or bolted together) and is configured to rotate with the output shaft. To illustrate, side gear 1351 can rotate relative to output gear 1310 (e.g., extension 1311 thereof) driven by a first motor (not shown), and side gear 1352 can rotate relative to output gear 1310 (e.g., extension 1321 thereof). Thrust washers 1381 and 1382 are arranged axially between extensions 1311 and 1321, respectively. Thrust washers 1381 and 1382 allow relative azimuthal displacement (e.g., relative rotation) between side gears 1351 and 1352 and respective extensions 1311 and 1321. Spider gears 1351 and 1352 are configured to rotate about the axis of shaft 1350 (e.g., a vertical axis parallel to axis 1301, as illustrated). In some embodiments, frame 1355 is affixed to shaft 1350, while in other embodiments, frame 1355 and shaft 1350 may include a single component.

Differential actuator 1358 is configured to engage and disengage output gear 1310 and frame 1355. As illustrated, differential actuator 1358 is engaged, and thus frame 1355, shaft 1350, and spider gears 1351 and 1352 rotate with output gear 1310 about axis 1399. Further as illustrated, output gear 1310 includes splines (not visible in FIG. 13) configured to engage with plunger 1359 of differential actuator 1358. Although not visible in FIG. 13, frame 1355 includes corresponding splines such that, in the configuration illustrated in FIG. 13, plunger 1359 of differential actuator 1358 also engages splines of frame 1355 such that frame 1355 and output gear 1310 rotate together. Plunger 1359 is configured to translate parallel to axis 1399 ("axially"), to engage and disengage output gear 1310 from the differential assembly (e.g., frame 1355 thereof).

Figure 14:
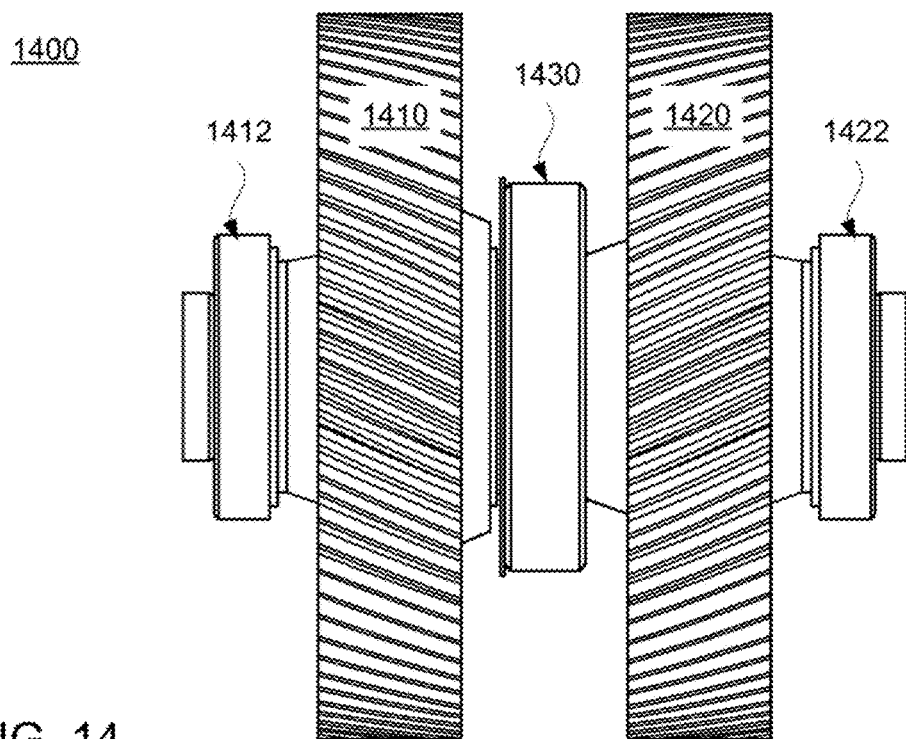
FIG. 14 shows a cross-sectional view of a portion of an illustrative drive system having a coupling, in accordance with some embodiments of the present disclosure.

FIG. 14 shows a cross-sectional view of a portion of illustrative drive system 1400 having a coupling, in accordance with some embodiments of the present disclosure. Drive system 1400 includes output gears 1410 and 1420 (e.g., driven by respective motors, which are not shown in FIG. 14), coupling 1430, and disconnects 1412 and 1422. Output gears 1410 and 1420 are configured to be driven independently by respective electric motors. Disconnects 1412 and 1422, which may include respective clutch assemblies, are configured to couple and decouple output gears 1410 and 1420 from respective wheels. Coupling 1430, which may include a differential assembly or a clutch assembly, is configured to couple and decouple output gears 1410 and 1420. For example, when engaged, coupling 1430 may allow a fully locked mode and/or single motor mode to be achieved (e.g., driven by either or more both motors). In a further example, when disengaged, coupling 1430 may allow a torque vectoring mode to be achieved. In some embodiments, each of coupling 1430 and disconnects 1412 and 1422 may include one or more actuators controlled by a control system to achieve one or more drive modes. In some embodiments, coupling 1430 includes a differential assembly, with a spider gearset coupled to one of output gears 1410 and 1420, with output shafts coupled to respective side gears engaged with the spider gearset.

Figure 15:
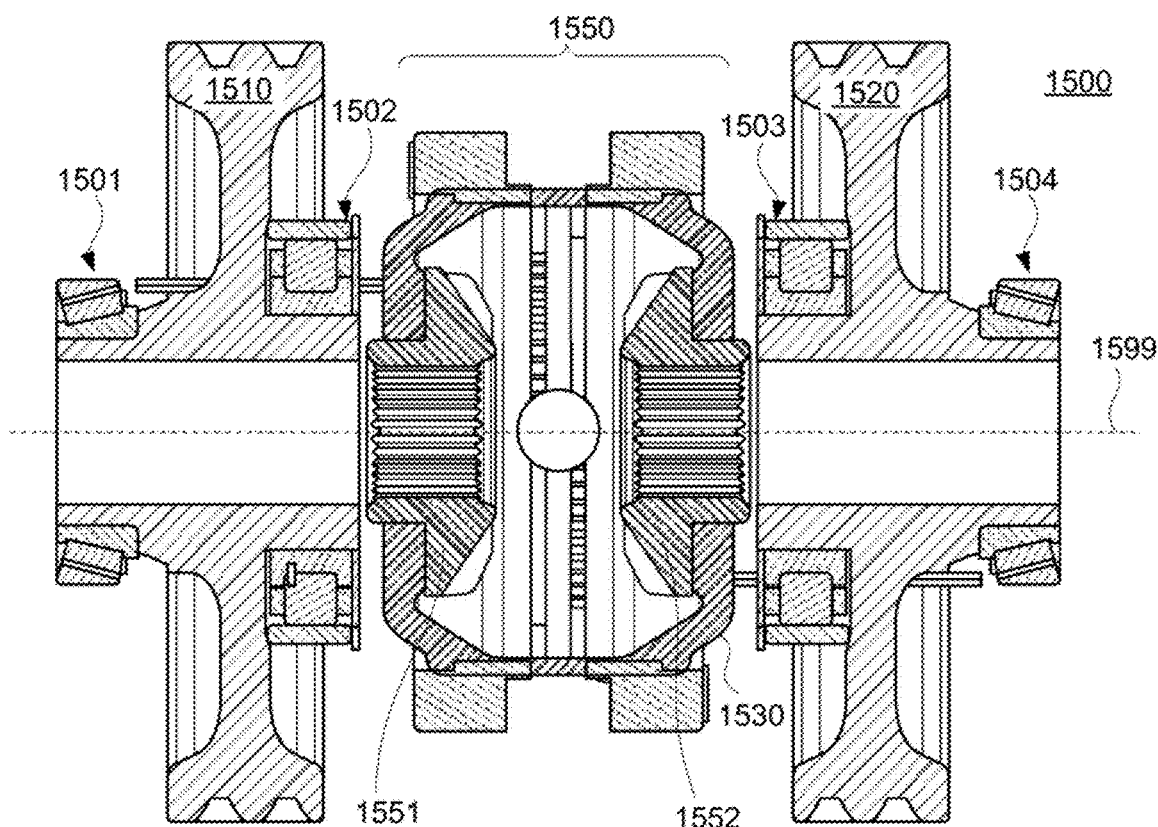
FIG. 15 shows a cross-sectional view of a portion of an illustrative drive system having an intermediate differential, in accordance with some embodiments of the present disclosure.

FIG. 15 shows a cross-sectional view of a portion of drive system 1500 having an intermediate differential assembly 1550, in accordance with some embodiments of the present disclosure. As illustrated, differential assembly 1550 includes housing 1530, rather than being integrated within a drive system housing (e.g., as illustrated in FIG. 8). Drive system 1500 includes output gears 1510 and 1520, bearings 1501-1504, and differential assembly 1550. Differential assembly 1550 may be bolted on or otherwise mounted to housings enclosing output gears 1510 and 1520. To illustrate, in some embodiments, differential assembly 1550 may be installed intermediate to existing housings corresponding to each of output gears 1510 and 1520, as an add-on component rather than an integrated component.

Bearings 1501 and 1502 are configured to constrain radial and axial displacement of output gear 1510 relative to axis 1599, while allowing azimuthal displacement (e.g., rotation) of output gear 1510 about axis 1599. Bearings 1503 and 1504 are configured to constrain radial and axial displacement of output gear 1520 relative to axis 1599, while allowing azimuthal displacement (e.g., rotation) of output gear 1520 about axis 1599. Differential assembly 1550 includes housing 1530, which is configured to be stationary, and side gears 1551 and 1552, which are configured to engage a spider gearset (not shown in FIG. 15). Each of side gears 1551 and 1552, as illustrated, include splines for coupling to respective output shafts (similar to drive system 800 of FIG. 8). Differential assembly 1550 may also include an actuator for locking and unlocking the differential. For example, when locked, the drive axis is fully locked (e.g., output gears 1510 and 1520 rotate at the same rate) and, when unlocked, the drive axis may achieve a neutral or torque vectoring mode.

Figure 16:
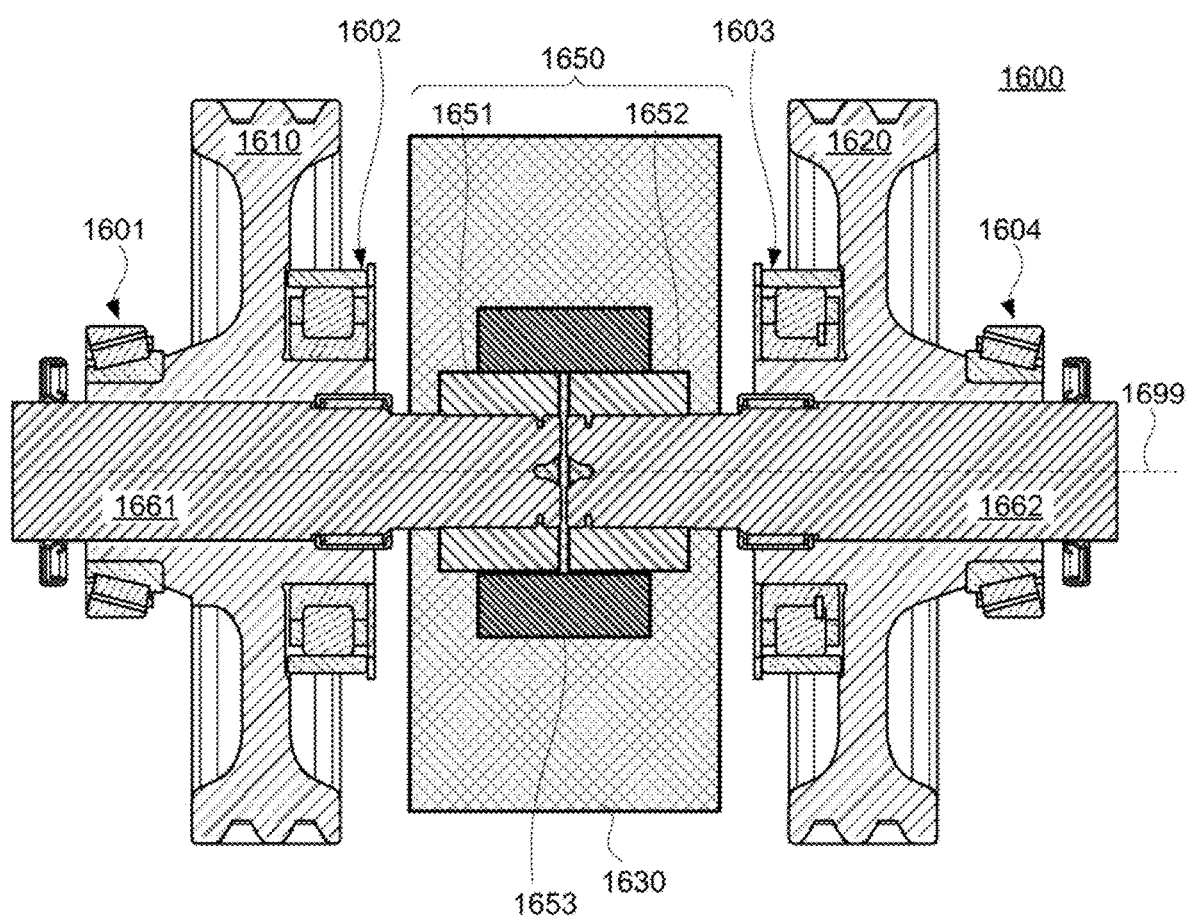
FIG. 16 shows a cross-sectional view of a portion of an illustrative drive system having an intermediate differential and intermediate clutches, in accordance with some embodiments of the present disclosure.

FIG. 16 shows a cross-sectional view of a portion of illustrative drive system 1600 having an intermediate differential and intermediate clutches, in accordance with some embodiments of the present disclosure. As illustrated, drive system 1600 includes output gears 1610 and 1620, planetary differential 1650, output shafts 1661 and 1662, and bearings 1601-1604. Although not illustrated in FIG. 16, drive system 1600 also includes a housing having stationary components. Differential assembly 1650 may be bolted on or otherwise mounted to housings enclosing output gears 1610 and 1620. To illustrate, in some embodiments, differential assembly 1650 may be installed intermediate to existing housings corresponding to each of output gears 1610 and 1620, as an add-on component rather than an integrated component. Output gear 1620 drives output shaft 1662, which rotates with gear 1652, all of which rotate with housing 1630. Output gear 1610 drives output shaft 1661, which rotate with gear 1651.

Bearings 1601 and 1602 are configured to constrain radial and axial displacement of output gear 1610 relative to axis 1699, while allowing azimuthal displacement (e.g., rotation) of output gear 1610 about axis 1699. Bearings 1603 and 1604 are configured to constrain radial and axial displacement of output gear 1620 relative to axis 1699, while allowing azimuthal displacement (e.g., rotation) of output gear 1620 about axis 1699. Differential assembly 1650 includes housing 1630, which is capable of rotation, planetary gears 1653, and gears 1651 and 1652, which are configured to engage planetary gear 1653. Each of gears 1551 and 1552 may include splines or keys for coupling to respective output shafts 1661 and 1662. Differential assembly 1650 may also include an actuator for locking and unlocking the differential. For example, when locked, the drive axis is fully locked (e.g., output gears 1610 and 1620 rotate at the same rate) and, when unlocked, the drive axis may achieve a neutral or torque vectoring mode. To illustrate, when unlocked, planetary gear 1653 may rotate about axis 1699, and gears 1651 and 1652 may rotate about axis 1699 at different rates.

Figure 17:
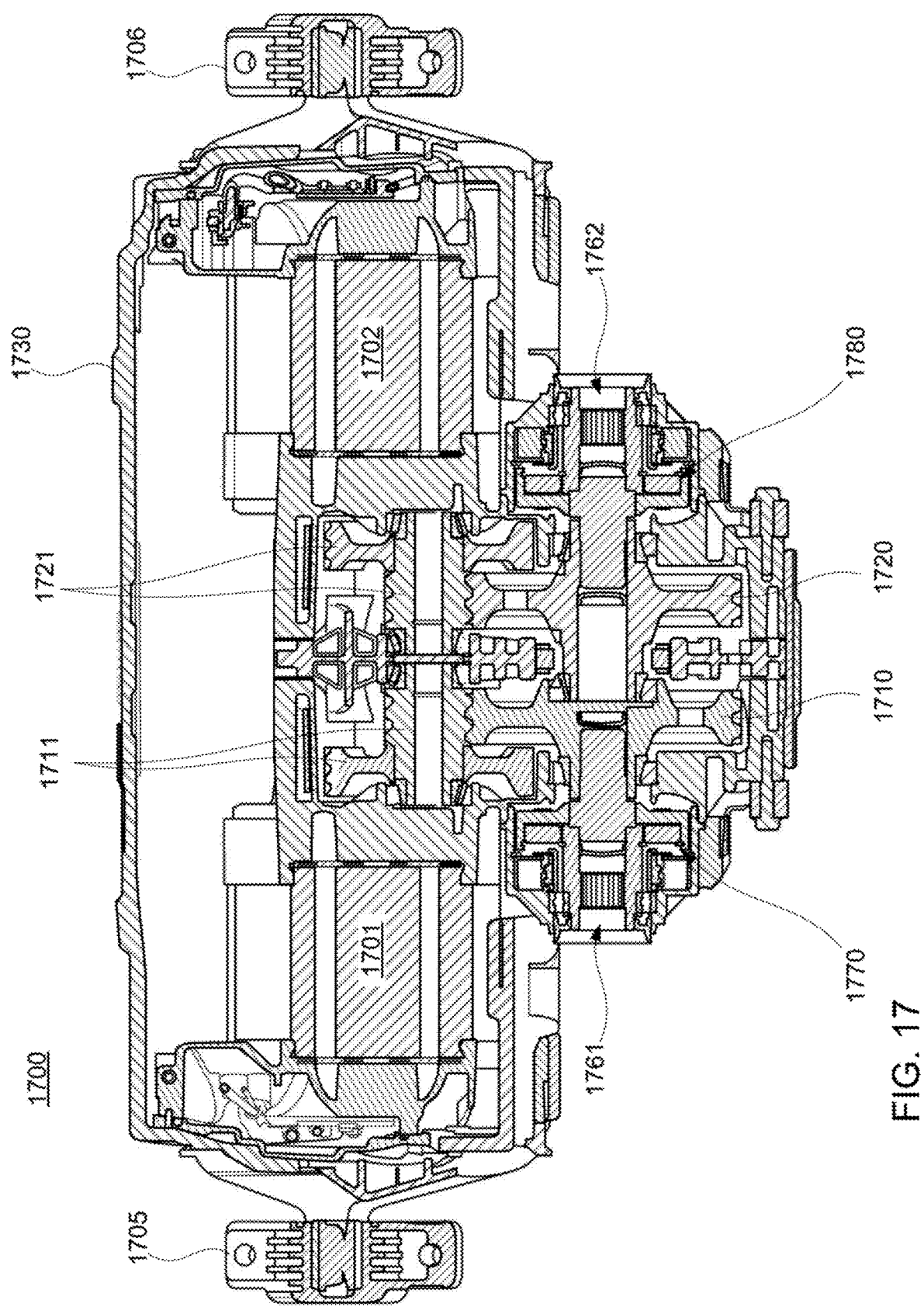
FIG. 17 shows a cross-sectional view of an illustrative drive system, in accordance with some embodiments of the present disclosure.

FIG. 17 shows a cross-sectional view of illustrative drive system 1700, in accordance with some embodiments of the present disclosure. As illustrated, drive system 1700 includes housing 1730, motors 1701 and 1702, intermediate gearsets 1711 and 1721, output gears 1710 and 1720, outputs 1761 and 1762, mounts 1705 and 1706. As illustrated, drive system 1700 does not include a differential assembly, although a suitable differential assembly may be integrated or output gears 1710 and 1720 and outputs 1761 and 1762 may be replaced with output gears having an integrated differential assembly. Motors 1701 and 1702 include respective motor gears, which engage with respective intermediate gearsets 1711 and 1721, which in turn engage with respective output gears 1710 and 1720. Outputs 1761 and 1762 include disconnects, and are splined to interface to respective drive shafts. Mounts 1705 and 1706 affix housing 1730 to the electric vehicle, and may include fasteners, bushings, any other suitable components, or any combination thereof. Clutch assemblies 1770 and 1780 allow coupling of output gear 1710 and output 1761, and output gear 1720 and output 1762, respectively. In an illustrative example, any of the illustrative arrangements and drive systems of FIGS. 2-16 may retrofitted into, or combined with drive system 1700 to provide differential functionality. To illustrate, output gears 1710 and 1720, and any other suitable components, may be redesigned, replaced, or otherwise modified to accommodate a differential assembly.

Figure 18:
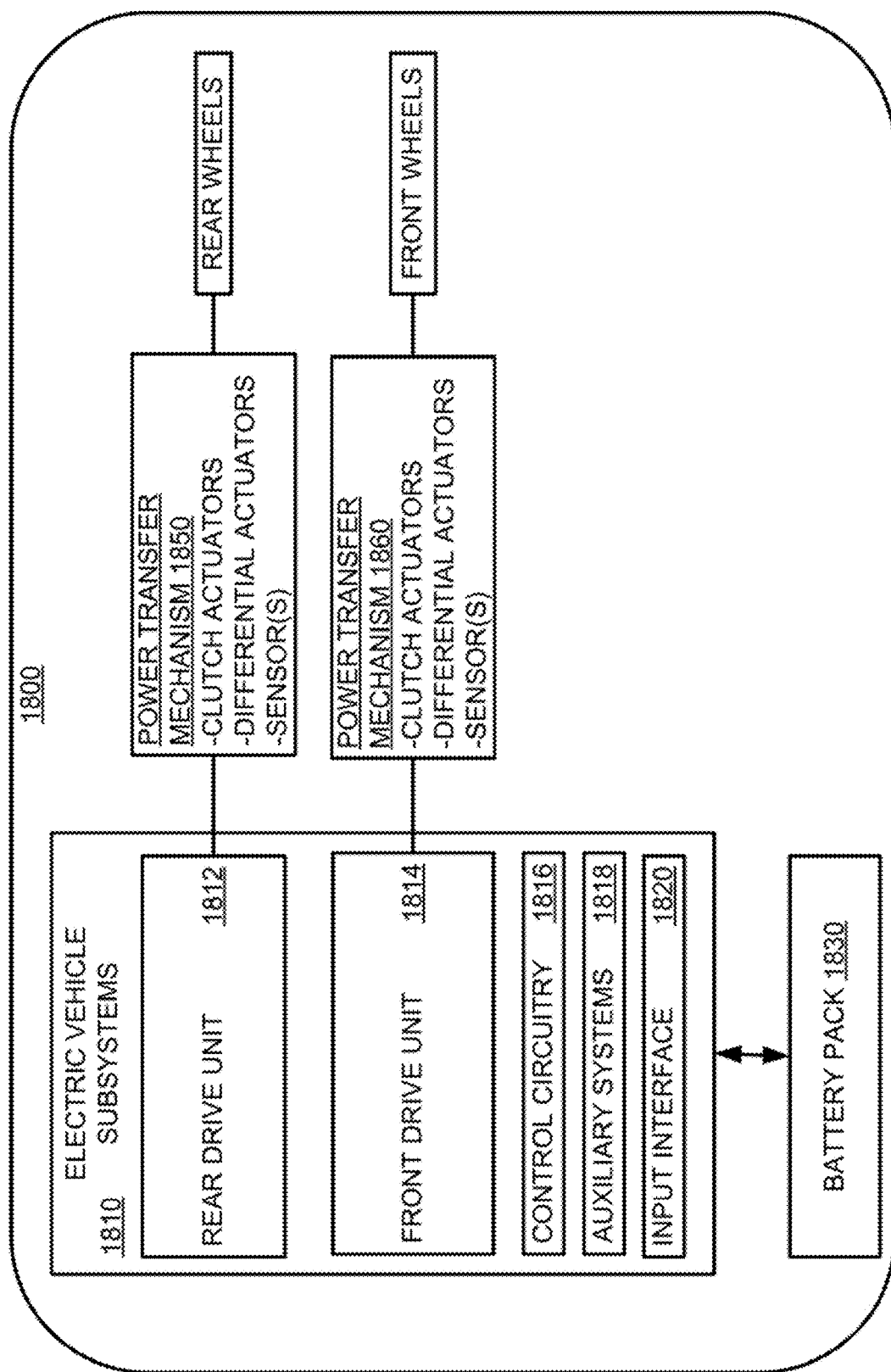
FIG. 18 shows a block diagram of an illustrative electric vehicle having a control system for controlling one or more drive units, in accordance with some embodiments of the present disclosure.

FIG. 18 shows a block diagram of illustrative electric vehicle 1800 having a control system for controlling one or more drive units, in accordance with some embodiments of the present disclosure. Electric vehicle 1800 includes battery pack 1830, electric vehicle subsystems 1810, suspension, and wheels. Electrical vehicle subsystems 1810 includes, for example, rear drive unit 1812, front drive unit 1814, control circuitry 1816, auxiliary systems 1818, input interface 1820, and any other suitable corresponding equipment. Electric vehicle 1800 includes power transfer mechanism 1850 (e.g., a gearbox, pulley system, or other mechanism for transferring shaft work) corresponding to one drive axis (e.g., rear drive axis) and power transfer mechanism 1860 corresponding to another drive axis (e.g., front drive axis). Electric vehicle 1800 may be the same as electric vehicle 100 of FIG. 1, for example, wherein front drive unit 110 and rear drive unit 120 correspond to power transfer mechanisms 1860 and 1850, respectively. In a further example, vehicle 1800 may include any of the illustrative arrangements and drive systems of FIGS. 2-17 as part of either or both of power transfer mechanisms 1850 and 1860. Vehicle subsystems 1810 may be used to, for example, monitor operation (e.g., sensor signals) of any of the illustrative arrangements and drive systems of FIGS. 2-17, control actuators (e.g., clutch actuators and/or differential actuators) of any of the illustrative arrangements and drive systems of FIGS. 2-17, or otherwise manage operation of any of the illustrative arrangements and drive systems of FIGS. 2-17. To illustrate, each of power transfer mechanisms 1850 and 1860 may include a left side gear train corresponding to a left halfshaft and a right side gear train corresponding to a right halfshaft.

In some embodiments, control circuitry 1816 may include processing equipment, memory, power management components, any other suitable components for controlling one or more drive unit (e.g., front drive unit 1814 and rear drive unit 1812), or any combination thereof. For example, control circuitry 1816 may control current flow (e.g., amount of current and current direction) to phases of an electric motor of one or more drive units (e.g., using electric power as stored in battery pack 1830). In a further example, control circuitry 1816 may control clutch operation (e.g., using an electromagnetically-actuated clutch) for one or more clutch assemblies. In a further example, control circuitry 1816 may control differential operation (e.g., using an electromagnetically-actuated differential) in a dual drive unit. In some embodiments, control circuitry 1816 is configured to actuate and de-actuate one or more clutch actuators (e.g., a first and second clutch actuator), a differential actuator, or a combination thereof. For example, control circuitry may provide control signals (e.g., communications, electric power, or both) to (i) one or more clutch actuators of power transfer mechanism 1850, 1860, or both, (ii) one or more differential actuators of power transfer mechanism 1850, 1860, or both, or (iii) a combination thereof. In a further example, the control signals may be binary (e.g., on/off application of a DC voltage), analog (e.g., the control signal may be proportional based on a voltage range, pulse-width modulation, or pulse-density modulation), oscillatory (e.g., and AC signal or other oscillating signal), any other suitable waveform or shape (e.g., square wave, sawtooth wave, triangular wave, rectified sinusoidal wave), or any combination thereof. In some embodiments, actuators are spring-loaded or otherwise biased in an engaged or disengaged state, and application of electrical power, hydraulic power, or pneumatic power from vehicle subsystem 1810 causes a change in state (e.g., engaged to disengaged, or disengaged to engaged).

In some embodiments, control circuitry 1816 may include one or more sensors, one or more sensor interfaces (e.g., for sensors that are included as part of a drive unit), corresponding wiring, corresponding signal conditioning components, any other suitable components for sensing a state of a drive unit, or any combination thereof. For example, control circuitry 1816 may include a speed sensor (e.g., a rotary encoder), a current sensor, a voltage sensor, a temperature sensor, any other suitable sensor, or any combination thereof. In some embodiments, control circuitry 1816 may be implemented by a central controller, a plurality of distributed control systems, an embedded system, or any combination thereof. For example, control circuitry 1816 may be at least partially implemented by an electronic control unit (ECU). In a further example, the electric vehicle may include a power electronics system that is controlled by the ECU and is configured to manage current to one or more electric motors of one or more drive units. Rear drive unit 1812 may be coupled to wheels of the electric vehicle by a half shaft, a constant-velocity joint, one or more suspension/steering components, any other suitable coupling, or any suitable combination thereof. Front drive unit 1814 may be coupled to wheels of the electric vehicle by a half shaft, a constant-velocity joint, one or more suspension/steering components, any other suitable coupling, or any suitable combination thereof. For example, a wheel may be mounted to a hub that is includes a bearing for a half-shaft, wherein the hub is coupled to suspension/steering components that are mounted to the vehicle frame (e.g., wherein the drive units are also mounted to the vehicle frame).

In some embodiments, a drive system may include a first drive unit and optionally a second drive unit, each including one or more clutch assemblies, and a differential assembly. In some embodiments, a system, in addition to including a drive unit (e.g., single or dual), may include processing equipment configured to activate and deactivate the clutch assembly to transfer torque, manage motor operation, manage regeneration (e.g., using the motor as a generator), perform any other control function, or any combination thereof. Activating and deactivating a clutch assembly may refer to completely, or partially, increasing or decreasing the engagement of elements of the clutch assembly (e.g., using control circuitry). For example, activating a clutch assembly may include completely locking the clutch, allowing some slip of the clutch, or otherwise transferring an amount of torque between the output shafts. In some embodiments, the drive unit may include at least one sensor (e.g., coupled to a sensor interface of control circuitry) configured to sense wheel slippage and the control circuitry may be further configured to receive a signal from the at least one sensor, detect that wheel slippage is occurring, and activate a clutch assembly, a differential assembly, or a combination thereof in response to detecting that wheel slippage is occurring. For example, a sensor may detect shaft speed (e.g., an output shaft speed, as measured by an encoder) or output torque (e.g., an output shaft torque, or a motor torque). In some embodiments, the drive system may include an accelerator pedal configured to indicate a desired speed (e.g., by being depressed by a user), and the processing equipment may receive a signal from the accelerator pedal, determine a speed parameter based on the signal, and activate one or more clutch assemblies, one or more differential assemblies, one or more motors, or a combination thereof, if the speed parameter is above a threshold. For example, if a user "floors" the accelerator pedal (e.g., more than 50% demand), the control circuitry may activate the clutch assemblies and differential assembly to lock the output shafts of a drive axis together. In some embodiments, the control circuitry may activate and deactivate a clutch assembly or differential assembly based on road conditions (e.g., icy roads, puddles, high winds), a drive mode (e.g., an off-road mode, a sport mode, or a traction mode), any other suitable criterion, or any combination thereof.

In some embodiments, one or more brackets, affixed at one or more locations, may be used to rigidly connect the two motors of the dual drive unit, two power transfer mechanism housings of the dual drive unit, or both, to ensure that all the components of the dual drive unit act as a single rigid body under normal operating conditions. In some embodiments, a boss, a tab, or other suitable feature may be included on a housing to aid in mounting.

In some embodiments, one or more drive units may be included in a vehicle. For example, Tables 2a and 2b includes some illustrative drive modes in accordance with the present disclosure. The four illustrative drive modes included in Table 2 correspond to a single drive axis, and may applied to each drive axis (e.g., independent of each other or dependent on each other). To illustrate, torque vectoring mode may allow fully independent wheel authority, hyper-mile mode may allow for a single motor to drive the drive axis (e.g., single motor propulsion differentiated to two wheels), locked mode allows for twice peak torque of either motor to be TABLE 2a Illustrative drive modes, with a differential lock at a left (L) gearset.

| Mode | Output Gear (L or 1) Connects to: | Output Gear (R or 2) Connects to: |
|---|---|---|
| Torque Vectoring | Side gear (L or 1) | Side gear (R or 2) |
| Hyper-Mile eco mode | Differential casing | nothing |
| Transition from hyper-mile to torque vectoring | Differential casing | Halfshaft or Side gear (R or 2) |
| Locked (2x peak torque available to a wheel) | Differential casing and Halfshaft or Side gear (L or 1) | Halfshaft or Side gear (R or 2) |
| Neutral (e.g., flat towing) | Nothing | Nothing |

TABLE 2b

Illustrative drive modes, with a differential lock at a left (L) gearset.

| Mode | Clutch (L) | Clutch (R) | Differential | Motor (L) | Motor (R) |
|---|---|---|---|---|---|
| Torque Vectoring | Locked | Locked | Unlocked | Active | Active |
| Hyper-Mile (Single motor) | Unlocked | Unlocked | Locked | Active | Inactive |
| Transition from hyper-mile to torque vectoring | Unlocked to Locked | Unlocked to Locked | Locked to Unlocked | Active or Inactive | Active or Inactive |
| Locked (2x peak torque available to a wheel) | Locked | Locked | Locked | Active or Inactive | Active or Inactive |
| Neutral (e.g., flat towing) | Unlocked | Unlocked | Unlocked | Inactive | Inactive | provided to a single wheel (e.g., a wheel with traction), and neutral mode allows for flat towing (e.g., no active torque is provided to the output shafts by the motors). In some embodiments, a center disconnecting differential is engaged to motor one (e.g., the left motor is as illustrated in FIGS. 4-11, and 13-17), and motor two (e.g., the other motor) is quickly engaged to provide differential torque left-to-right. For example, this may be used to quickly provide a transition to torque vectoring from hyper-mile mode (e.g., single motor mode to a two-motor mode). As illustrated in Tables 2a and 2b, the output gear (e.g., and corresponding halfshaft) interfaced to the casing of the center disconnecting differential may be referred to herein as "left (L)" for "1" while the other output gear (e.g., and corresponding halfshaft) may be referred to herein as "right (R)" or "2."

FIG. 19 is a flowchart of an illustrative process 1900 for managing an electric vehicle drivetrain, in accordance with some embodiments of the present disclosure. Process 1900 may be implemented by electric vehicle 1800 of FIG. 18, which may include any suitable drive system such as those illustrated in FIGS. 1-17. For example, control circuitry 1816 may execute computer instructions to control one or more clutch actuators (e.g., for one or more drive axes), one or more differential actuators (e.g., for one or more drive axes), receive sensor signals from one or more sensors, retrieve reference information, any other suitable function, or any combination thereof to implement process 1900. In some embodiments, for example, the system implements an application that includes computer-executable instructions stored on non-transitory computer-readable media.

At step 1902, the system determines a drive mode for each of one or more drive axes. In some embodiments, the system selects a drive mode from among a plurality of drive modes (e.g., such as the drive modes illustrated in Tables 2a and 2b). The system may determine the drive mode based on a torque command, a current command, a speed (e.g., a wheel speed, a shaft speed, a gear speed, or a relative speed thereof), an energy consumption metric, an energy storage metric (e.g., a state of charge of battery system 1830 of FIG. 18), a user input received at input interface 1820, reference information (e.g., stored in a database or otherwise in memory), any other suitable information, or any combination thereof. The system may implement, or take as input, sensor input, user input, reference information, executable instructions, logic commands, any other suitable information or instruction, or any combination thereof.

In some embodiments, at step 1902, the system takes as input one or more sensor signals such as current signals (e.g., current in a DC bus, current in one or more motor phases), voltage signals (e.g., voltage across a DC bus, voltage across one or more motor phases), rotational position information (e.g., angular position, speed, or acceleration of a wheel, shaft, or gear), battery pack information (e.g., state of charge, estimated remaining battery life, fault information, usage information, energy consumption rate), pedal position information (e.g., from a driver controlled foot pedal for acceleration or braking), reference settings stored in memory, any other suitable information, or any combination thereof. In some embodiments, the system receives an input selection from input interface 1820 indicating the user has selected a particular drive mode (e.g., using a turnable knob, touchscreen, push button, voice command, or any other suitable input type). In some embodiments, at step 1902, the system may identify a drive mode. For example, the system may identify fully locked mode (e.g., and proceed to step 1904) when selected by the user, when the vehicle is traveling along a straight path, when the vehicle has consistent grip at both wheels of a drive axis, when maximum or an otherwise large amount of acceleration is desired, or based on any other suitable criterion or combination thereof. In a further example, the system may identify a single motor mode (e.g., and proceed to step 1906) when selected by the user, when the vehicle is traveling a long distance, when the vehicle has consistent grip at both wheels of a drive axis, when maximum or an otherwise large amount of acceleration is not required, or based on any other suitable criterion or combination thereof. In a further example, the system may identify a torque vectoring mode (e.g., and proceed to step 1908) when selected by the user, when the vehicle is traveling off-road, when the vehicle has inconsistent grip at both wheels of a drive axis, when road conditions are dynamic or slippery, when maximum or an otherwise large amount of acceleration is intermittently required, when a tank turn is desired, or based on any other suitable criterion or combination thereof.

In a further example, the system may identify a neutral mode (e.g., and proceed to step 1910) when selected by the user, when the vehicle is traveling a long distance, when road conditions are consistent and non-slippery, when maximum or an otherwise large amount of acceleration is not required, or based on any other suitable criterion or combination thereof.

At step 1904, the system achieves a fully locked mode. For example, the drive axis in the fully locked mode is driven by both motors (e.g., the vehicle may be either front wheel drive, rear wheel drive, or both). In some embodiments, at step 1906, the system engages or causes to be engaged the first clutch, engages or causes to be engaged the second clutch, engages or causes to be engaged the differential, and controls rotation of the first motor, the second motor, or both. For example, the system may apply current to phases of either or both the first motor and the second motor to generate torque at the fully locked output, which drives both wheels at the same angular rotation (e.g., although not necessarily the same torque). To illustrate, any of the first clutch, the second clutch, and the differential may be configured to be engaged without input (e.g., normally engaged), disengaged without input (e.g., normally disengaged), or require input to be affirmatively either engaged or disengaged. In some embodiments, step 1904 includes generating and transmitting a signal to an actuator of the first clutch assembly, the second clutch assembly, the differential assembly, or a combination thereof. In an illustrative example, a fully locked mode is illustrated in FIGS. 6 and 10.

At step 1906, the system achieves a single motor mode. For example, the drive axis in the single motor mode is driven by a single motor (e.g., the vehicle may be either front wheel drive, rear wheel drive, or both). In some embodiments, at step 1906, the system disengages or causes to be disengaged the first clutch, disengages or causes to be disengaged the second clutch, engages or causes to be engaged the differential, and controls rotation of the first motor. For example, the system may allow the second motor to freewheel without electric power input, mechanically lock the motor in place, or otherwise not provide phase current to the second motor. To illustrate, any of the first clutch, the second clutch, and the differential may be configured to be engaged without input (e.g., normally engaged), disengaged without input (e.g., normally disengaged), or require input to be affirmatively either engaged or disengaged. In some embodiments, step 1906 includes generating and transmitting a signal to an actuator of the first clutch assembly, the second clutch assembly, the differential assembly, or a combination thereof. In an illustrative example, a single motor mode is illustrated in FIGS. 7 and 11.

At step 1908, the system achieves a torque vectoring mode. For example, the drive axis in the torque vectoring mode allows both wheels to be controlled independently (e.g., the vehicle may be front wheel drive, rear wheel drive, or both). In some embodiments, at step 1908, the system engages or causes to be engaged the first clutch, engages or causes to be engaged the second clutch, disengages or causes to be disengaged the differential, and controls rotation of both the first motor and the second motor. For example, the system may provide the same torque, or different torque to each wheel of the drive axis by providing currents to the phases of the first and second motor. To illustrate, any of the first clutch, the second clutch, and the differential may be configured to be engaged without input (e.g., normally engaged), disengaged without input (e.g., normally disengaged), or require input to be affirmatively either engaged or disengaged. In some embodiments, step 1908 includes generating and transmitting a signal to an actuator of the first clutch assembly, the second clutch assembly, the differential assembly, or a combination thereof. In an illustrative example, a torque vectoring mode is illustrated in FIGS. 5 and 9.

At step 1910, the system achieves a neutral mode. For example, the drive axis in the neutral mode is towed by the other drive axis (e.g., the vehicle is either front wheel drive or rear wheel drive but not both). In some embodiments, at step 1910, the system disengages or causes to be disengaged the first clutch, disengages or causes to be disengaged the second clutch, disengages or causes to be disengaged the differential. In some embodiments, at step 1910, the system allows both the first motor and the second motor to freewheel (e.g., without electric power input). For example, the system may provide the same torque, or different torque to each wheel of the drive axis by providing currents to the phases of the first and second motor. To illustrate, any of the first clutch, the second clutch, and the differential may be configured to be engaged without input (e.g., normally engaged), disengaged without input (e.g., normally disengaged), or require input to be affirmatively either engaged or disengaged. In some embodiments, step 1910 includes generating and transmitting a signal to an actuator of the first clutch assembly, the second clutch assembly, the differential assembly, or a combination thereof.

At step 1912, the system updates the drive mode for the one or more drive axes. For example, in some embodiments, the system updates the drive mode for each drive axis. In a further example, in some embodiments, the system updates the drive mode for each drive axis having a differential assembly. In a further example, in some embodiments, the system updates the drive mode for a particular drive axis. The system may update the drive mode at a predetermined frequency, a frequency dependent on operating parameters (e.g., vehicle speed, shaft speed, gear speed), in response to an event (e.g., a change in operating parameter, an input received at an input interface), In an illustrative example, referencing a vehicle having two drive axes (e.g., front and rear drive units), several vehicle modes are achievable. For example, Table 3 shows several configurations, which may be generated by combining Tables 1 and 2. Some of the configurations Table 3 may be inaccessible for drive axes without dual clutches to decouple output shafts from output gears. For example, the drive units of the present disclosure may be included at a front drive axis, a rear drive axis, or both, with the particular arrangement governing which configurations are accessible.

TABLE 3

Illustrative configurations of a vehicle having two drive axes.

| Mode | Front Type | Front Mode | Rear Type | Rear Mode |
| --- | --- | --- | --- | --- |
| Full Torque Vectoring | With or without Differential | Torque Vectoring | With or without Differential | Torque Vectoring |
| Front Torque Vectoring | With or without Differential | Torque Vectoring | With or without Differential | Any Suitable Mode |
| Rear Torque Vectoring | With or without differential | Any Suitable Mode | With or without Differential | Torque Vectoring |
| All-Wheel Fully Locked | With differential | Fully Locked Mode | With differential | Fully Locked Mode |

TABLE 3-continued

Illustrative configurations of a vehicle having two drive axes.

| Mode | Front Type | Front Mode | Rear Type | Rear Mode |
|---|---|---|---|---|
| Front Fully Locked | With differential | Fully Locked Mode | With or without Differential | Any Suitable Mode |
| Rear Fully Locked | With or without Differential | Any Suitable Mode | With differential | Fully Locked Mode |
| Two-axis, Two motor | With differential | Single Motor Mode | With differential | Single Motor Mode |
| Front Single motor | With differential | Single Motor Mode | With or without Differential | Any Suitable Mode |
| Rear Single motor | With or without differential | Any Suitable Mode | With differential | Single Motor Mode |
| Full Neutral | With or without differential | Neutral Mode | With or without differential | Neutral Mode |
| Front Neutral | With or without differential | Neutral Mode | With or without differential | Any Suitable Mode |
| Rear Neutral | With or without differential | Any Suitable Mode | With or without differential | Neutral Mode |

By implementing a differential between the output gears of a front or rear drive unit, and having selective clutches to vary torque paths, the system is able to achieve powering both wheels of a drive axis with a single motor and/or gearset. For example, the system may achieve 5% improvement or more in overall range of the vehicle in single motor mode. In a further example, locked mode may allow an additional 5% range improvement through the ability to lower the torque output of the motor and gearbox while maintaining high peak torque per wheel by locking the differential. In a further example, the neutral is achieved by disconnecting both wheels, which may be advantageous for service or flat towing a vehicle (e.g., behind a truck or recreational vehicle). The configurations of the present disclosure may allow for flexibility in drive mode as well as significant range improvement over other two or three motor vehicle architectures.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A system, comprising:
a first output gear configured to rotate based on a first motor, wherein a first halfshaft is configured to rotate based on the first output gear;
a second output gear configured to rotate based on a second motor, wherein a second halfshaft is configured to rotate based on the second output gear;
differential elements coupled to the first halfshaft and to the second halfshaft; and
a differential actuator configured to:
engage the differential elements to the first output gear, the differential elements and output gear thereby forming a differential when engaged, and
disengage the differential elements from the first output gear to enable the first output gear to drive the first halfshaft independent of the second halfshaft.

2. The system of claim 1,
wherein the formed differential enables the first halfshaft and the second halfshaft to rotate based on the first output gear while the second output gear is disconnected from the second halfshaft.

3. The system of claim 1, wherein:
the differential elements are coupled to a side gear for the second halfshaft, and
the formed differential enables the second halfshaft to rotate based on the second side gear.

4. The system of claim 1, wherein:
the differential elements are coupled to a first side gear for the first halfshaft; and
the first and second output gears generate an increase in torque to one or more of the first and the second halfshafts.

5. The system of claim 1, further comprising:
a first clutch assembly configured to connect the first output gear to the first halfshaft by transferring torque from the first output gear to the first halfshaft; and
a second clutch assembly configured to connect the second output gear to the second halfshaft by transferring torque from the second output gear to the second halfshaft.

6. The system of claim 5, wherein:
the differential actuator is further configured to disengage the first output gear from a casing of the differential elements; and
when the first output gear is disengaged from the casing, the first and second output gears generate independent torques to the respective first and second halfshafts.

7. The system of claim 1, wherein the differential elements comprise a differential casing and spider gears.

8. The system of claim 1, further comprising:
a stationary housing;
a first bearing arranged between the first output gear and the stationary housing;
a second bearing arranged between the second output gear and the stationary housing; and
a third bearing arranged between the first output gear and the second output gear.

9. A drive system of a vehicle comprising,
a first output gear driven by a first motor;
a first clutch assembly configured to couple and decouple the first output gear from a first halfshaft coupled to a first wheel;
a second output gear driven by a second motor;
a second clutch assembly configured to couple and decouple the second output gear from a second halfshaft coupled to a second wheel;
differential elements configured to couple the first output shaft to the second halfshaft; and
a differential actuator configured to:
engage the differential elements to the first output gear, the differential elements and output gear thereby forming a differential when engaged, and
disengage the differential elements from the first output gear to enable the first output gear to drive the first halfshaft independent of the second halfshaft.

10. The drive system of claim 9, wherein the first motor and the second motor are configured to be independently controlled.

11. The drive system of claim 9, further comprising control circuitry, wherein:

the first clutch assembly comprises a first actuator coupled to the control circuitry;

the second clutch assembly comprises a second actuator coupled to the control circuitry;

the differential actuator is coupled to the control circuitry; and the control circuitry is configured to actuate and de-actuate each of the first actuator, the second actuator, and the differential actuator.

12. The drive system of claim 11, wherein the control circuitry is configured to:

achieve a first drive mode wherein the first clutch assembly is engaged, the second clutch assembly is engaged, and the differential elements are disengaged from the first output gear;

achieve a second drive mode wherein the first clutch assembly is engaged, the second clutch assembly is engaged, and the differential elements are engaged with the first output gear; and achieve a third drive mode wherein the first clutch assembly is disengaged, the second clutch assembly is disengaged, and the differential elements are engaged with the first output gear.

13. The drive system of claim 9, wherein the differential elements comprise a spider gearset coupled to a differential casing, the drive system further comprising:

a first side gear coupled to the first halfshaft and engaged with the spider gearset;

a second side gear coupled to the second halfshaft and engaged with the spider gearset;

a first thrust washer arranged between the first side gear and the first output gear; and a second thrust washer arranged between the second side gear and a stationary section of a housing.

14. A method for managing drive modes of a drive axis, the method comprising:

controlling a first clutch coupling a first output gear and a first halfshaft of the drive axis;

controlling a second clutch coupling a second output gear and a second halfshaft of drive axis;

controlling a differential actuator configured to:

engage the differential elements to the first output gear, the differential elements and output gear thereby forming a differential when engaged, and disengage the first output gear from differential elements to enable the first output gear to drive the first halfshaft independent of the second halfshaft; and controlling at least one of a first motor coupled to the first output gear or a second motor coupled to the second output gear.

15. The method of claim 14, further comprising:

determining to achieve a torque vectoring mode at the drive axis; and achieving the torque vectoring mode by:
causing to be engaged the first clutch;
causing to be engaged the second clutch;
causing the differential actuator to disengage the differential elements from the first output gear, and
independently controlling rotation of the first motor and rotation of the second motor.

16. The method of claim 14, further comprising:

determining to achieve a fully locked drive mode at the drive axis; and achieving the fully locked drive mode by:
causing to be engaged the first clutch;
causing to be engaged the second clutch; and
causing the differential actuator to engage the differential elements with the first output gear.

17. The method of claim 14, further comprising:

determining to achieve a single motor drive mode; and achieving the single motor drive mode by:
causing to be disengaged the first clutch;
causing to be disengaged the second clutch;
causing the differential actuator to engage the differential elements with the first output gear; and
controlling rotation of the first motor.

18. The method of claim 17, further comprising allowing the second motor to freewheel without electric power input.

19. The method of claim 14, further comprising:

determining to achieve a neutral drive mode at the drive axis; and achieving the neutral drive mode by:
causing to be disengaged the first clutch;
causing to be disengaged the second clutch;
causing the differential actuator to disengage the differential elements from the first output gear; and
allowing both the first motor and the second motor to freewheel without electric power input.

20. The method of claim 14, further comprising determining a drive mode based on at least one of a signal from speed sensor, an energy consumption metric, an input to a user interface, a torque value of the first motor, or a torque value of the second motor.

* * * * *